INVENTOR.
HALLIS N. STEPHAN

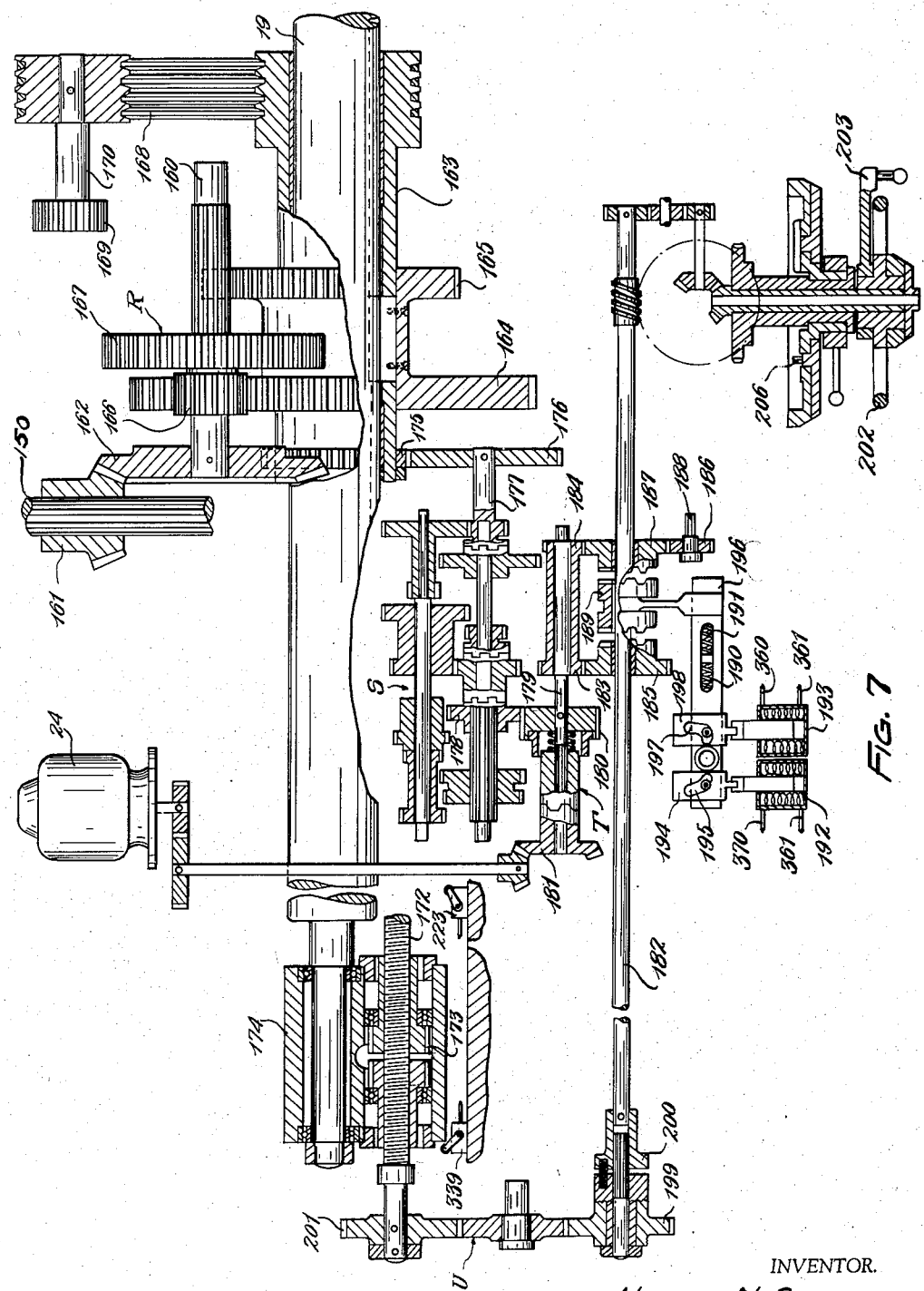

Jan. 18, 1944. H. N. STEPHAN 2,339,435
MACHINE TOOL
Filed April 18, 1940 10 Sheets-Sheet 8

INVENTOR.
HALLIS N. STEPHAN
BY Kwis Hudson & Kent
ATTORNEYS

INVENTOR.
HALLIS N. STEPHAN
BY
ATTORNEYS

Patented Jan. 18, 1944

2,339,435

UNITED STATES PATENT OFFICE 2,339,435

MACHINE TOOL

Hallis N. Stephan, Cleveland Heights, Ohio, assignor, by mesne assignments, to The Lucas Machine Tool Company, Bratenahl, Ohio, a corporation of Ohio Application April 18, 1940, Serial No. 330,413

5 Claims. (Cl. 29—26)

The present invention relates to machine tools.

An object of the invention is the provision of a novel indexing means for automatically stopping a power-driven member, such as the work table or spindle head of a boring machine, at a predetermined point and indicating the accuracy with which the member stops with reference to a predetermined desired place.

Another object of the present invention is the provision of a novel indexing mechanism including a precision dial indicator, end measuring rods, and/or inside micrometers, etc., for automatically stopping a power-driven member, such as the work table or spindle head, etc., of a boring machine, at a predetermined point or points and indicating on the precision dial indicator the accuracy with which the member stops at the desired place.

Another object of the present invention is the provision of a novel machine tool comprising a member movable relative to a support and power means for moving the same, and comprising means for automatically stopping the member at a predetermined point or points and indicating the accuracy with which the member stops at the desired place.

Another object of the present invention is the provision of a novel machine tool including a member movable relative to a support and power means for moving the same, and comprising means including end measuring rods and/or inside micrometers, etc., and a precision dial indicator for automatically stopping the member at a predetermined point or points and indicating the accuracy with which the member stops at the desired place on the dial indicator.

Another object of the present invention is the provision of a novel horizontal boring machine including a power-driven, vertically movable spindle head and a power-driven, horizontally movable table and comprising means for automatically stopping the head or table at a predetermined point or points and indicating the accuracy with which the head or table stops at the desired position.

Another object of the present invention is the provision of a novel horizontal boring machine including a power-driven, vertically movable spindle head and a power-driven, horizontally movable table, and comprising means including end measuring rods, and/or inside micrometers, etc., and a precision dial indicator or indicators for automatically stopping the spindle head or table at a predetermined point or points and indicating the accuracy with which the member or members stop at the desired place on the dial indicators.

Another object of the invention is the provision of a horizontal boring and milling machine comprising a motor for moving the spindle head, saddle, and table, adapted to be selectively connected to the various elements moved thereby by electrically-operated clutches, the control circuits for which motor and clutches comprise indicating lights indicating which element is connected to the motor and are so interlocked that under no circumstances can more than one of said elements be connected to the motor and only that element which is so indicated.

The present invention resides in certain details of construction and combinations and arrangements of parts and further objects and advantages thereof will be apparent to those skilled in the art to which the invention relates from the following description of the preferred embodiment thereof described with reference to the accompanying drawings forming a part of this specification in which similar reference characters designate corresponding parts and in which Fig. 1 is a front elevational view of a horizontal boring machine embodying the present invention;

Fig. 7 is a diagrammatic view of the portion of the mechanism for rotating, feeding and traversing the spindle which is located in the spindle head;

Figure 3:
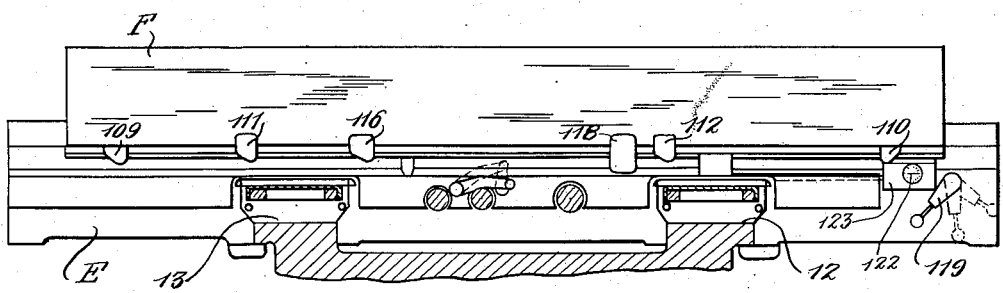
Fig. 3 is a sectional view approximately on the line 3—3 of Fig. 1.
Figure 8:
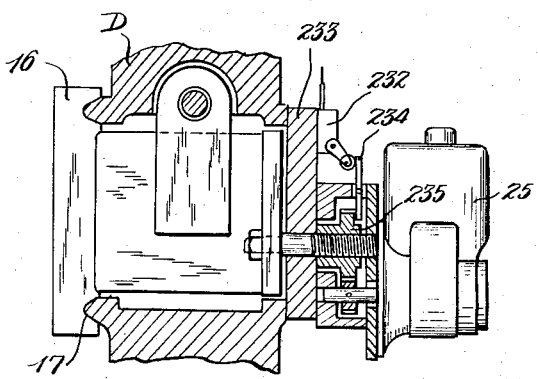
Fig. 8 is a section through the backrest clamping mechanism approximately on the line 8—8 of Fig. 1.

Referring to the drawings, the machine shown therein comprises a base A, provided at one end with a spindle head column B formed with vertical ways 10 and 11 upon which a spindle head C is mounted for vertical movement, and at the other end with a backrest or outboard support column D slidably supported on horizontal ways 12 and 13, see Fig. 3, formed on the upper side of the bed. The ways 12 and 13 also support a saddle E having transverse horizontal ways 14 and 15 on the upper side which in turn support a work table F. The backrest column D is provided with vertical ways 16 and 17, see Fig. 8, upon which a backrest block G is mounted for vertical movement.

The spindle head which is counterbalanced by a weight (not shown) is adapted to be moved vertically along the ways 10 and 11 by a lead screw 18 rotatably supported in the machine in a suitable manner and having threaded engagement with a nut fixed in the spindle head. In addition to being rotatable in opposite directions, the tool spindle 19 is movable in opposite directions longitudinally of its axis of rotation at different speeds to effect both feeding and traversing movements. The backrest block or outboard support G is movable simultaneously with the movement of the spindle head C by a vertical lead screw 20 located within the backrest column D and connected to the drive or mechanism for rotating the screw 18. The saddle E is movable longitudinally of the tool spindle along the ways 12 and 13 and the table F is movable transversely of the tool spindle along the ways 14 and 15 at different speeds by mechanism hereinafter specifically referred to.

The speed and direction of rotation of the spindle, etc., and the aforesaid movements of the various elements, such as the feed and rapid traverse of the spindle, head, saddle, table, etc., are performed by power and their operation may be controlled from any convenient place about the machine. In the embodiment of the invention shown, five electric motors are employed; a reversible motor 21 hereinafter referred to as the feed and rapid traverse motor, suitably supported on the bed within a guard 22 adjacent to the left-hand end of the machine; a reversible main driving motor 23 arranged for ceiling mounting, also enclosed within the guard 22; a spindle rapid traverse, reversible motor 24 mounted on the head C; a reversible motor 25 for clamping and releasing the backrest block; and a reversible motor 26 (not shown on the machine) for moving the backrest column D.

The feed and rapid traverse motor 21 is connected to the saddle and table feeding and rapid traversing mechanism and to the spindle head and backrest raising and lowering mechanism, the main driving motor 23 is connected to the spindle rotating and feeding mechanism, and the small reversible motor 24 on the head actuates the rapid traverse for the tool spindle through an overrunning clutch. The feed and main driving motors are adapted to be selectively connected to the various operating elements through the medium of suitable speed change transmissions, shafts, gears, clutches, etc., the controls for which are located on or adjacent to the base A, spindle head C, and/or pendant control station H fixed to the lower end of a tubular rod connected to a universally movable arm 27 by a flexible cable 28.

The reversible motor 21 is operatively connected to a horizontally extending shaft 30 rotatably supported in the base A, through the medium of a V-belt drive 31 and spur gears 32 and 33. From the gear 33 the drive is either at a relatively slow or feeding rate through a variable feed change transmission, designated generally by the reference character J, and an overrunning clutch device, designated generally by the reference character K, or at a relatively high or traversing rate through a normally disengaged disk clutch L, a shaft 34, and the overrunning clutch mechanism K. The feed change gears, etc., are housed within a suitable gear box in the base A. Through the medium of the transmission J, the shaft 30 may be rotated at various speeds, and through the medium of the normally disengaged friction clutch L, the driven element of which is carried by a gear 35 continuously in mesh with the gear 33, the shaft 30 may be selectively rotated at a high rate of speed. The gear 33 is keyed to the driven shaft of the feed change transmission J and the gear 35 is journaled on the shaft 34. The driving element of the friction clutch L is splined to a shaft 34, which shaft is in axial alignment with the shaft 30 and is adapted to be actuated to engage the clutch L upon energization of an electrically-operated solenoid 36 connected to one lever of a bell crank lever 37 pivoted on the frame, the other lever of which is connected to a member 38 which in turn actuates the clutch elements.

The last or driving gear 39 of the transmission J is continuously in mesh with a gear 40 which forms the low speed element of the overrunning clutch mechanism K. The gear 40 is rotatably supported on the shaft 34 and has formed integral therewith the driving element 41 of a normally engaged toothed clutch, the driven element 42 of which is splined on the shaft 30. The left-hand end of the driven element 42, as viewed in Fig. 2, has a plurality of sloping teeth or cam surfaces 43 which cooperate with similar teeth 44 on a high speed driving member 45 fixed to the right-hand end of the high speed shaft 34. The member 42 is continuously urged towards the left, as viewed in Fig. 2, by a compression spring 46 interposed therebetween and the gear 40. The construction is such that the shaft 30 is normally connected to the transmission J through the normally engaged clutch elements 41 and 42 and the gears 39 and 40, with the shaft 34 rotating at the same speed as the shaft 30 due to the engagement of the teeth 43 and 44.

Upon engagement of the friction clutch L, the shaft 34 is rotated at a higher rate of speed than the shaft 30. This difference in speed causes the teeth 43 of the slidable clutch element 42 to climb the teeth 44 of the element 45 carried by the shaft 34, with the result that the slidable clutch element 42 is moved towards the right, disengaging the teeth thereof from the teeth of the clutch element 41, which in turn disengages the low speed drive. Thereafter, the shaft 30 rotates at the same high speed as the shaft 34. Movement of the member 42 towards the right is limited by the compression spring 46, and the construction is such that the cooperating teeth 43 and 44 are never permitted to clear each other. Both sides of the teeth 43 and 44 are inclined which makes the device operable for either direction of rotation of the motor 21. When the clutch L is released, the spring 46 reengages the cooperating clutch teeth of the clutch elements 41 and 42, and reconnects the feed to the shaft 30 in place of the rapid traverse.

Figure 1:
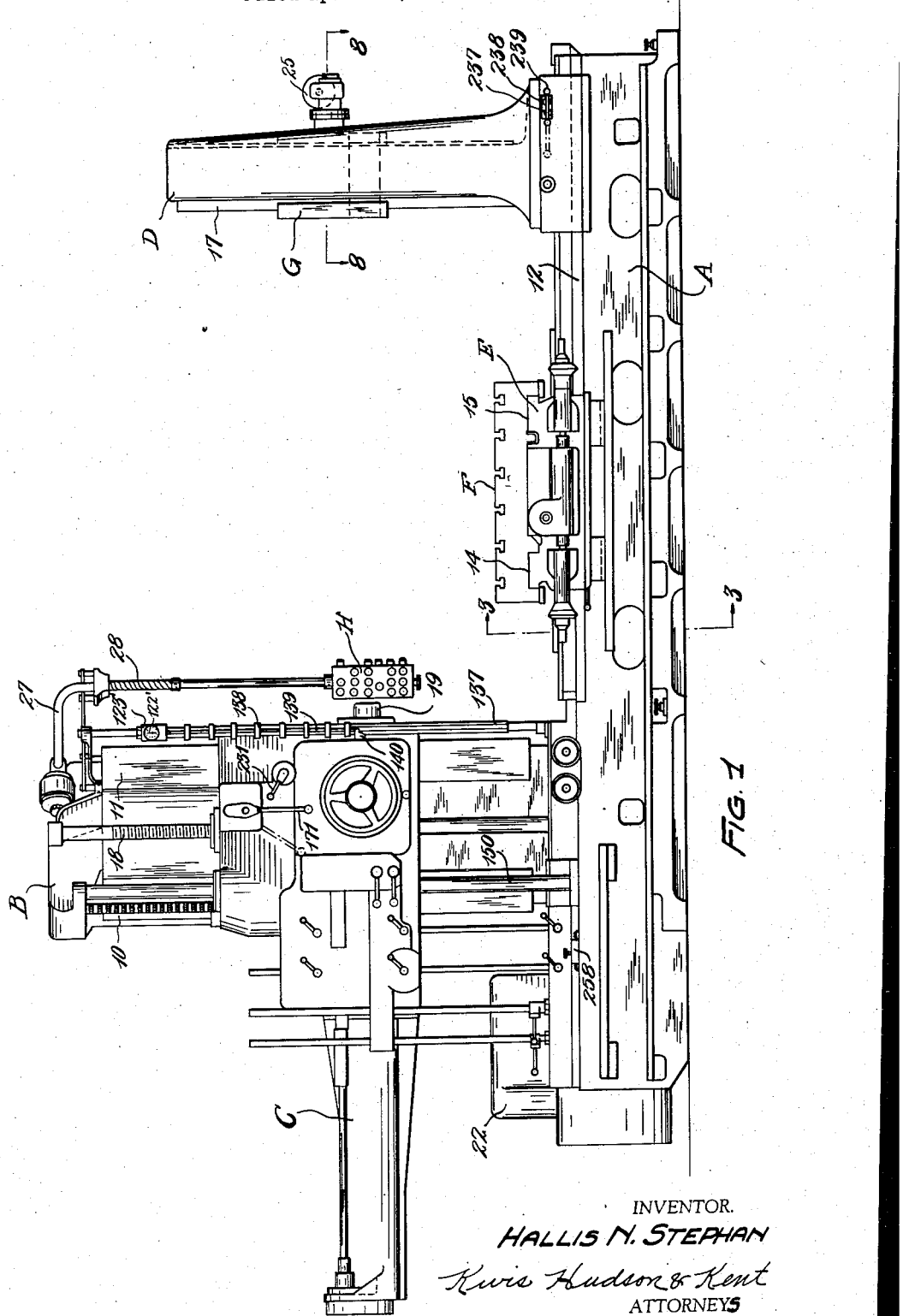
Figure 2:
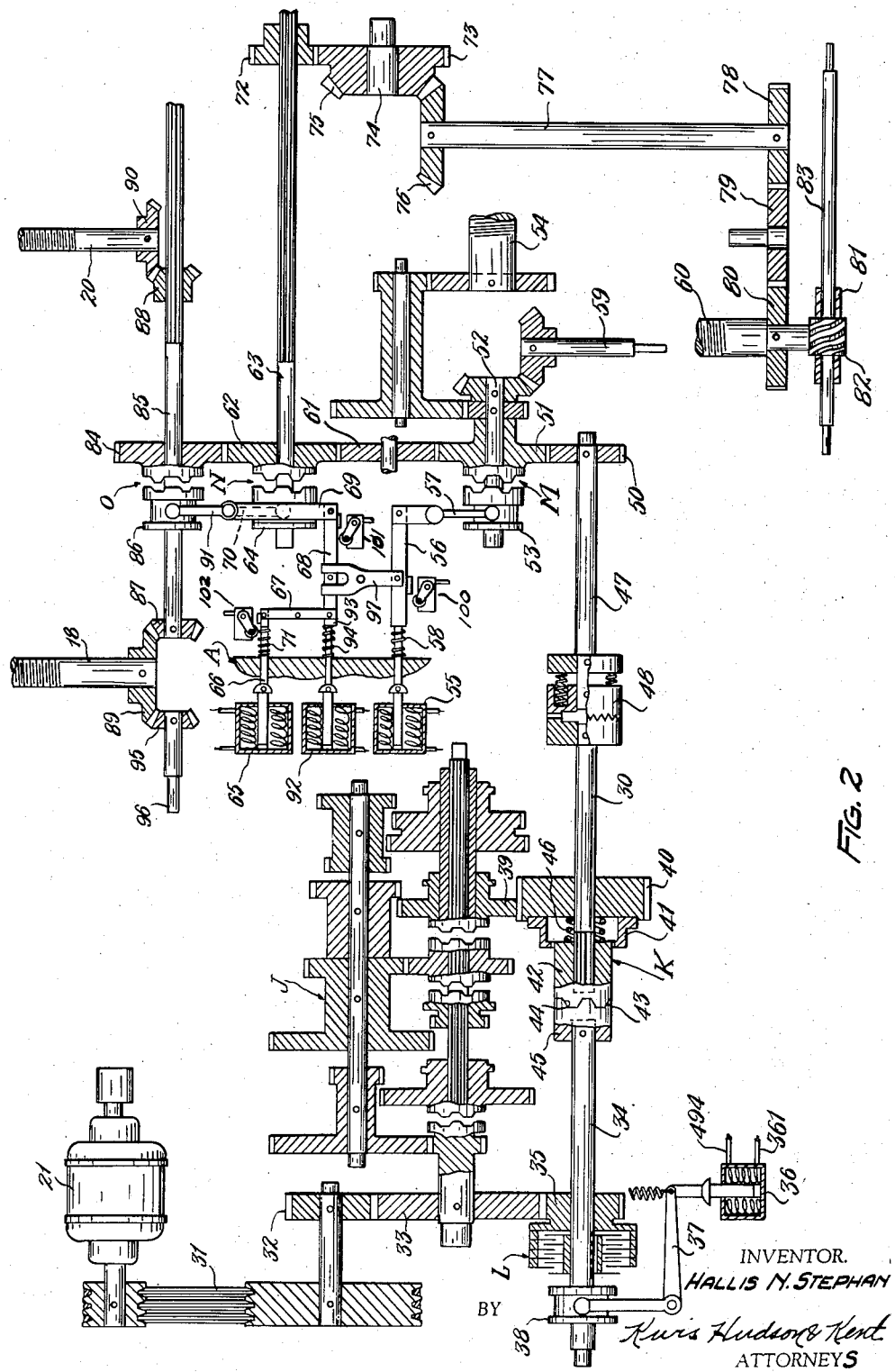
Fig. 2 is a diagrammatic view showing the power drive for reciprocating the saddle and table, and for raising and lowering the spindle head and the backrest block.

The shaft 30 is also in axial alignment with a third shaft 47 to which it is connected by a normally engaged overload release clutch 48, operable in either direction. The right-hand end of the shaft 47, as viewed in Fig. 2, is provided with a gear 50 continuously in mesh with the gear 51 rotatably supported on a shaft 52 to which it is adapted to be selectively connected by a normally disengaged positive drive clutch M, the driven element 53 of which is splined on the left-hand end of the shaft 52 and provided with clutch teeth adapted to engage clutch teeth formed on the hub of the gear 51. The shaft 52 is operatively connected in a suitable manner to a lead screw 54 extending longitudinally of the machine and rotatably supported in the base A, which lead screw moves the saddle E along the ways 12 and 13.

The movable element 53 of the normally disengaged clutch M is adapted to be moved toward the right, as viewed in Fig. 2, to engage the clutch and thereby connect the lead screw 54 to the shaft 47 and in turn the feed and rapid traverse motor 21 by an electric solenoid 55 suitably supported in the base A of the machine, the armature of which solenoid is connected to the slidable clutch element 53 by a slidable rod 56 and a pivoted yoke member 57. The clutch is normally held in disengaged position by a compression spring 58 surrounding the rod 56 and interposed between the frame of the machine and a shoulder on the rod 56. A hand feed is provided for the saddle E in the form of a rotatable shaft 59, the front end of which projects to the front of the machine where it is arranged for the reception of a hand crank.

The table F is adapted to be moved along the ways 14 and 15 of the saddle E by a lead screw 60 rotatably supported in the saddle and operatively connected to a suitable nut fixed to the underside of the table. The lead screw 60 is adapted to be selectively connected to the shaft 47 in a manner similar to that in which the lead screw 54 is selectively connected to said shaft 47, which manner of connection has just been described. The gear 51 journaled on the shaft 52 is continuously in mesh with a gear 61 which in turn is continuously in mesh with a gear 62 journaled on a shaft 63 rotatably supported in the base A and extending substantially the length thereof.

The gear 62 is adapted to be selectively connected to the shaft 63 by a normally disengaged positive drive tooth clutch N similar to the clutch M. The slidable element 64 of the clutch N is splined to the left-hand end of the shaft 63 and is moved towards the right to engage the teeth thereof with teeth formed on the hub of gear 62 by an electric solenoid 65, the armature of which is adapted to be connected to the movable clutch element 64 through the medium of a slidable rod 66 connected to the armature and to one end of a pivoted lever 67, the opposite end of which lever is connected to a slidable rod 68 which in turn is connected to a pivoted lever 69 carried by a short shaft journaled in the frame, to the lower end of which shaft is secured a clutch operating yoke 70 that engages in a groove formed in the movable clutch member 64. The pivoted lever 69 is continuously urged in a clockwise direction, as viewed in Fig. 2, by a compression spring 71 interposed between the frame of the machine and a shoulder on the lever 66. The construction is such that upon energization of the solenoid 65, the armature is moved towards the left, rotating the member 69 in a counterclockwise direction and engaging the clutch N.

The shaft 63 is operatively connected to the lead screw 60 in the following manner: A gear 72 carried by the saddle E and splined to the shaft 63 is continuously in mesh with a gear 73 journaled on a shaft 74 and formed integral with a bevel gear 75. The bevel gear 75 meshes with a bevel gear 76 fixed to the rear end of the transverse shaft 77 rotatably supported in the saddle E, the forward end of which is connected to the lead screw 60 by change gears 78, 79, and 80, the first of which is keyed to the forward end of the shaft 77 and is continuously in mesh with the idler gear 79, which in turn meshes with the gear 80 keyed to the lead screw 60. The forward end of the lead screw is provided with a worm wheel 81 continuously in mesh with the worm 82 fixed to a shaft 83 journaled in the saddle and extending longitudinally of the machine. The ends of the shaft 83 project from opposite sides of the saddle and are arranged for the reception of a hand crank.

The lead screw 18 which raises and lowers the spindle head and the lead screw 20 which raises and lowers the backrest block are adapted to be selectively connected to the shaft 47 in a manner similar to that in which the lead screws 54 and 60 are connected to the shaft 47. For this purpose, the gear 62 is continuously in mesh with a gear 84 journaled on a longitudinally extending shaft 85 to which it is adapted to be operatively connected by a normally disengaged tooth clutch O, similar in construction to the clutches M and N previously referred to, the movable element 86 of which is splined to the shaft 85. The shaft 85 carries two bevel gears 87 and 88 continuously in mesh with bevel gears 89 and 90 fixed to the lower end of the lead screws 18 and 20, respectively. The gear 88 is splined to the shaft 85 and moves therealong with movement of the outboard column D.

The movable element 86 of the clutch O is adapted to be shifted longitudinally of the shaft 85 to engage and disengage the clutch by a clutch yoke member 91 formed integral with the clutch yoke member 70. The clutch yoke 91 is adapted to be rotated in a clockwise direction to engage the clutch O by an electric solenoid 92, the armature of which is connected to the lower end of the pivoted lever 67 by a slidable rod 93. A compression spring 94 surrounding the rod 93 and interposed between the frame of the machine and a shoulder on the lever 93 normally maintains the clutch O disengaged. The gear 89 fixed to the lower end of the lead screw 18 is also engaged by a bevel gear 95 fixed to the rear end of a shaft 96 projecting to the front of the machine where it is arranged for the reception of the hand crank. This construction provides means for manually raising or lowering the spindle head and the backrest block. The slidable members 56 and 68 are mechanically interlocked by a Y-shaped member 97 pivotally supported intermediate its ends by the frame of the machine in such a manner that by moving one the other can be pulled into its neutral position. The lower end of the member 97 is pivotally connected to the member 56 and a pin 98 carried by the member 68 projects between the upper ends thereof.

The transmission J shown comprises four shiftable elements for obtaining different feeds. These elements may be moved in any convenient manner. The mechanism for moving the shiftable elements of the transmission J per se forms no part of the present invention and will not be described in detail. The preferred form of mechanism is shown in a copending application of Henry M. Lucas et al., Serial No. 243,616, filed December 2, 1938.

From the foregoing, it will be apparent that the saddle, table, spindle head, and backrest block may be operated selectively either manually or by the reversible feed and rapid traverse motor 21. If operated by the motor 21, the movements may be in either direction and at either a feed rate or a rapid traverse rate. The arrangement of the clutches for moving the saddle, table, and spindle head and backrest block is such that it is impossible to simultaneously engage two clutches. The manner in which the solenoids 36, 55, 65, and 92 are energized will be hereinafter more specifically referred to. The construction also includes three double throw electric switches 100, 101, and 102, the former of which is operatively connected to the rod 56 in such a manner that a normally open circuit therethrough is closed and two normally closed circuits therethrough are opened when the clutch M is engaged, and vice versa. The switch 101 is operatively connected to the rod 68 in a manner similar to that in which the switch 100 is connected to the rod 56, and one of the three circuits through the switch 101 is closed when the clutch O is engaged and when discharged the other two circuits are closed, and vice versa. The switch 102 is operatively connected to the rod 66 in such a manner that a normally open circuit therethrough is closed and two normally closed circuits therethrough are opened when the clutch N is engaged, and vice versa. The function of these switches will be hereinafter referred to. The machine also includes a number of normally closed limit switches which stop the feed and rapid traverse motor 21 when the particular element, that is, head, saddle, or table, being moved thereby, reaches the end of its travel. These limit switches are interlocked in a manner hereinafter described so that the limit switches of the elements not being moved will not interfere with the actuation of the element which it is desired to feed or rapid traverse.

Reciprocation of the table F is adapted to be automatically controlled by five limit switches 103, 104, 105, 106 and 107. The limit switches 103, 104, and 105 are normally closed switches and control the feed movement, and the limit switches 106 and 107 control the rapid traverse movement. The table back and forward limit switches 103 and 104, respectively, are adapted to be opened by downwardly extending projections 108 on a plurality of stops 109, 110, 111 and 112, respectively, the first two of which stops are fixed to a member carried by the table proper while the second two are adjustable therealong. The downwardly extending projections on the stops are adapted to engage the upper end of a lever 113 pivotally supported in the saddle E, the lower end of which lever is adapted to engage the operating arms of the limit switches 103 or 104, depending upon the direction in which the lever is rotated. The adjustable stops 111 and 112 provide means for automatically stopping the table at any place intermediate its extreme limits and the fixed stops 109 and 110 limit the extreme movement of the table.

Figure 4:
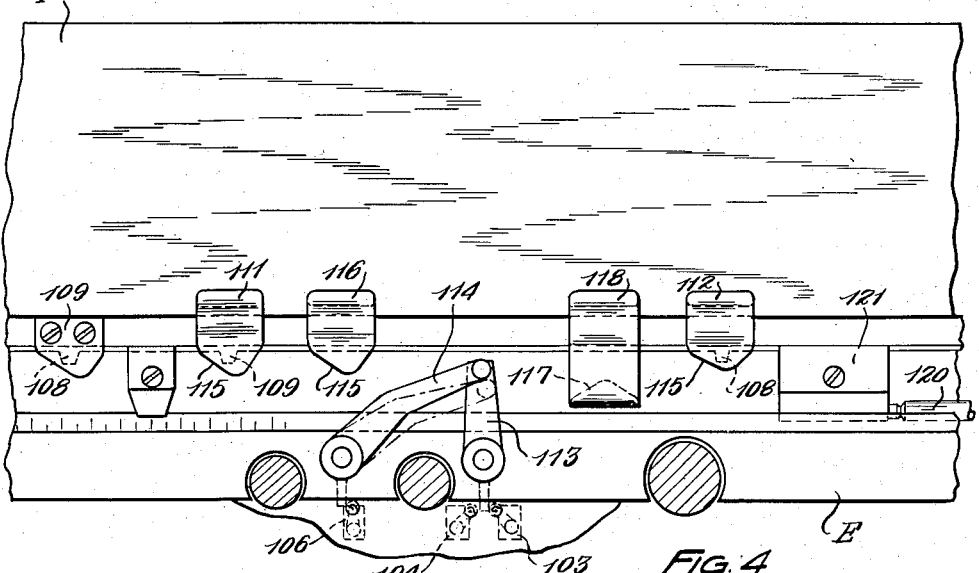
Fig. 4 is an enlarged view of a portion of Fig. 3.

The double throw table jump feed rapid traverse switch 106 is so located in the control circuit that the solenoid 36 is energized and the rapid traverse drive made operative upon the closing of normally open contacts thereof. The switch is operated so as to close the normally open contacts and open the normally closed contacts thereof by the lower end of a lever 114 pivoted in the saddle E, which lever has three positions; the full line and the dotted line positions shown in Fig. 4 and the full line position shown in Fig. 3. The lever is adapted to be shifted from the full line position shown in Fig. 4 to the dotted line position shown therein to open the normally open contacts of switch 106 and discontinue the rapid traverse movement by inclined cam surfaces 115 on the stops 109, 110, 111, and 112 previously mentioned, and an adjustable stop 116. The lever 114 is adapted to be rotated from the full line position shown in Fig. 4 to the dotted line position shown therein by the cam surfaces 115 as they pass over the upper end of the lever irrespective of the direction in which the table is moved. An inclined cam surface 117 on an adjustable stop 118 moves the lever 114 in the opposite direction. The construction is such that any predetermined arrangement of feed movements and rapid traverse movements desired can be obtained by a proper selection and adjustment of stops, but in no event can the table be moved past the fixed stops 109 and 110. When the lever 114 is rotated to the position shown in Fig. 3, it is entirely clear of all of the stops and the table can be moved without danger of the rapid traverse being automatically thrown in. The same result could be accomplished, less conveniently, however, by removing the stop or stops 118.

Manual means is provided for rotating the lever 114 from one position to another in the form of a lever 119 operatively connected thereto through mechanism (not shown) which lever has three positions corresponding with the three positions of the lever 114. The saddle E has a groove formed on the upper side of an extension thereon adapted to receive end measuring rods 120, the left-hand end of which, as viewed in Figs. 3 and 4, cooperate with an anvil on an adjustable block 121 carried by the table F. The construction is such that the adjustable block 121 does not interfere with the stops previously referred to.

Figure 5:
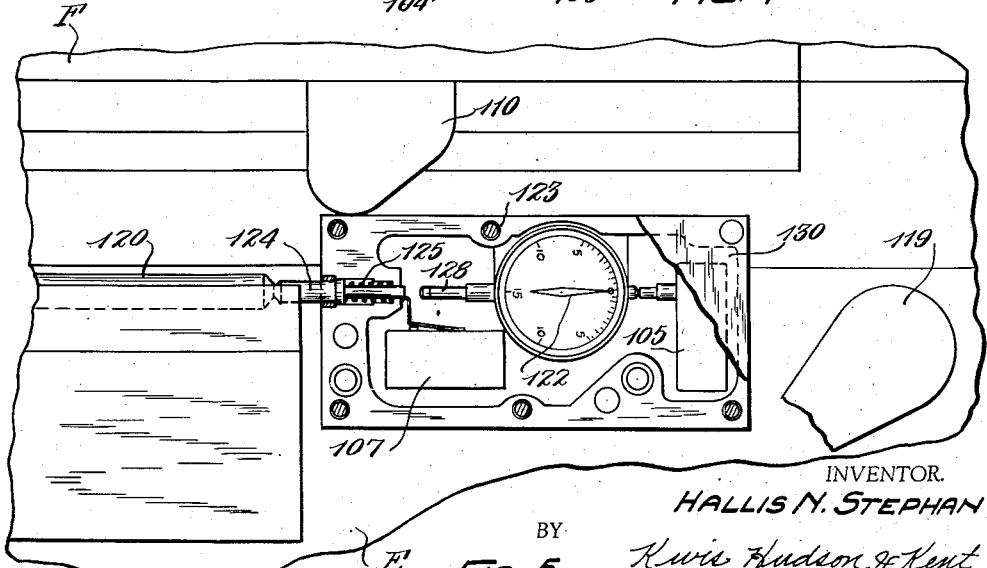
Fig. 5 is an enlarged view of a portion of Fig. 3.

The right-hand end of the measuring rods cooperate with a table dial indicator 122 and the limit switches 105 and 107, all of which are enclosed within a housing 123 bolted or otherwise suitably secured to the front end of the saddle. When the table is moved towards the front, the front end of the end measuring rods 120 engage a member 124 slidably supported in an aperture in the housing 123 and continuously urged towards the left, as viewed in Fig. 5, by a compression spring 125. As the member 124 is forced inwardly by the end measuring rods 120, the right-hand end thereof first engages the operating arm of automatic index rapid traverse forward switch 107 which opens the circuit therethrough. The opening of the switch 107 changes the speed of movement of the table from rapid traverse to feed. Further movement of the member 124 actuates the dial indicator 122. The plunger 128 of the dial indicator 122 projects through the gauge housing and the right-hand end thereof, as viewed in Fig. 5, is adapted to engage the operating arm of automatic index forward limit switch 105 and open the circuit therethrough stopping the forward movement of the table. The automatic index switches 105 and 107 are of such construction that the opening of the contacts can be accurately controlled. The particular switches shown are known as "micro" switches. The accuracy with which the table stops at any predetermined place is indicated on the dial indicator 122. The housing 123 is ordinarily closed by a removable cover 130 provided with a window through which the dial indicator 122 can be reached and observed. The indexing mechanism just described operates in the following manner:

Assuming that the table has been previously stopped by the automatic index forward feed limit switch 105 and it is desired to move the table forward a predetermined amount, for example, six inches, with the present construction it is only necessary to remove a suitable length of rod gauge, in the present instance a six inch length, and manually initiate the forward rapid traverse drive for the table, which is accomplished in a manner hereinafter described. The table will then move forward at a rapid traverse rate until the automatic index rapid traverse forward switch 107 is opened, deenergizing the solenoid 36, whereupon the table will continue to move forward at the feed rate until the automatic index forward feed limit switch 105 is opened. When the switch 105 opens, the table stops and the accuracy with which the table has moved the desired distance can be read or checked on the dial indicator 122 which has previously been set at zero. With the construction shown the table can be repeatedly stopped within a fraction of a thousandth of an inch of the desired position.

The upper and lower limits of movement of the spindle head C are controlled by two normally closed limit switches 135 and 136 fixed to the spindle head C and adapted to cooperate with upper and lower adjustable stops carried on the three rear splines of a vertical six-spline shaft 137. The stops have projections thereon which make it impossible to move the spindle head C past the same. The limit switches 135 and 136 are not shown on the machine but their location in the electrical circuit will be hereinafter referred to. A plurality of members 138 adapted to be clipped on the front splines of the shaft 137 and adjustable therealong provide means for supporting end measuring rod 139, the lower end of which is supported on an anvil carried by a projection 140 on the spindle head C. The upper end of the end measuring rod or rods 139 is adapted to cooperate with a spindle head dial indicator gauge 122' and two switches 105' and 107' enclosed within a housing 123' suitably secured to the upper end of the shaft or rod 137. The construction and the operation of the spindle head dial indicator 122', the limit switches 105' and 107', and the housing 123', etc., are the same as the dial indicator 122, the switches 105 and 107, the housing 123, etc., and will not be described in detail again. Suffice it to say that as the spindle head is moved in an upward direction the upper end of the top measuring rod engages a member similar to the member 124 slidably supported in an aperture in the housing 123'. As this member is forced inwardly by the measuring rods the upper end thereof first opens the spindle head automatic index rapid traverse up switch 107' changing the speed of movement of the head from rapid traverse to feed. Further movement of the member actuates the dial indicator 122'. The plunger of the dial indicator gauge 122' projects through the housing of the dial indicator and the upper end thereof is adapted to engage and open the spindle head automatic index feed limit switch 105' stopping the spindle head. The accuracy with which the spindle head stops is indicated on the dial indicator 122'.

The saddle right and backrest column left limit switch 145 and the saddle left limit switch 146 (not shown on the machine) are located underneath the rear of the saddle on the left and right-hand sides, respectively, are adapted to be opened upon engagement with stops located on the backrest column and on the bed of the machine, and limit the travel of the saddle towards the right and left, respectively, and the backrest column towards the left.

Figure 6:
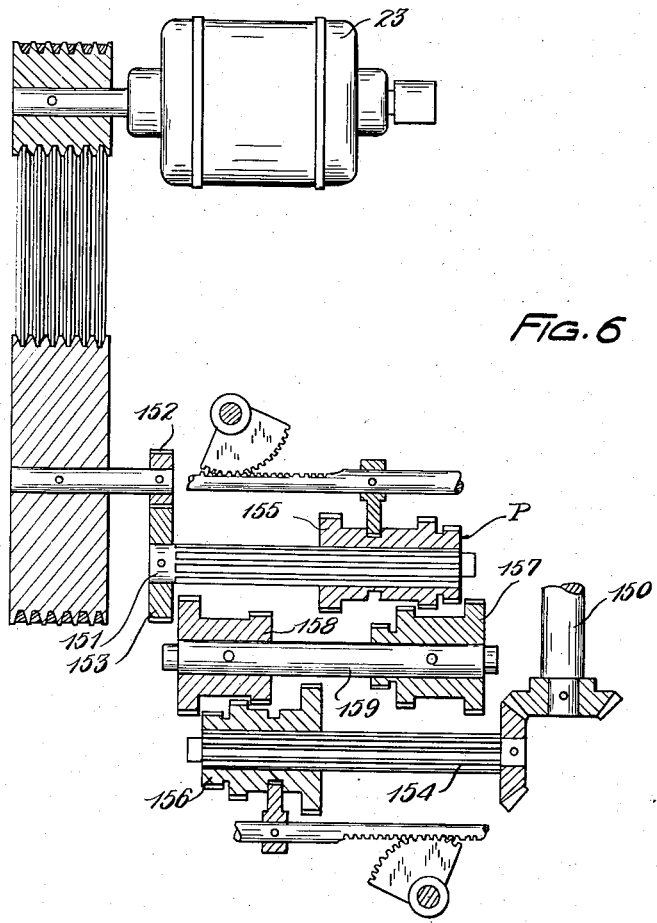
Fig. 6 is a diagrammatic view of that portion of the drive for rotating and reciprocating the spindle which is located in the base of the machine.

The spindle 19 is adapted to be rotated at various rates of speed by the main driving reversible motor 23 through the medium of speed change gearing, designated generally by the reference character P, see Fig. 6, housed in a suitable gear box supported in the bed of the machine; a vertical shaft 150, the lower end of which is rotatably supported in the gear box while the upper end is supported in the head column B; and back gears, designated generally by the reference character R, located in the spindle head C. The motor 23 is connected to the driven shaft 151 of the speed change transmission P by a V-belt drive and spur gears 152 and 153, the former of which is fixed to a shaft carrying the driven pulley of the V-belt drive while the latter is fixed to the shaft 151. The driving shaft 154 of the transmission P is connected to the lower end of the vertical shaft 150 by miter gears. The speed change transmission P provides nine different speeds and comprises gear clusters 155 and 156 slidably supported on the shafts 151 and 154, respectively, and adapted to cooperate with gear clusters 157 and 158 fixed to an intermediate shaft 159.

The gear clusters 155 and 156 are adapted to be shifted lengthwise of the shafts 151 and 154 upon which they are slidably splined to obtain the various speeds by any suitable mechanism. The particular mechanism illustrated forms no part of the present invention per se and will not be illustrated and described herein in detail. Suffice it to say that the mechanism shown, which is the preferred mechanism, is similar to that disclosed in the aforesaid copending application of H. M. Lucas et al., Serial No. 243,616, to which reference is made for a detailed description thereof.

The driven shaft of the back gears R is rotatably supported in the spindle head and is connected to the upper end of the vertical shaft 150 by a bevel gear 161 carried by the spindle head and splined to the shaft 150. The bevel gear 161 meshes with a bevel gear 162 fixed to the left-hand end of the shaft 160. The spindle 19 is slidably keyed within a spindle quill 163 rotatably supported by suitable bearings in the spindle head C, which spindle quill has a gear cluster comprising the gears 164 and 165 fixed thereto. The gears 164 and 165 are adapted to be selectively engaged by gears 166 and 167, respectively, of a gear cluster splined to the shaft 160. A high speed drive is obtainable through the medium of a V-belt final drive 168 when the gear 167 is shifted into engagement with a gear 169 fixed to a short shaft 170 journaled in the spindle head, which shaft carries the driving pulley of the V-belt drive 168. The gear cluster comprising the gears 166 and 163 is adapted to be shifted along the shaft 160 by a hand lever 171 fixed to the front end of a horizontal shaft journaled in the spindle head, the rear end of which shaft carries a yoke member engageable with the gear cluster.

The spindle 19 is adapted to be fed or rapid traversed in either direction by a lead screw 172 rotatably supported in the spindle head extension and having threaded engagement with a two-piece nut 173 located within the feed slide 174 adjacent to the left-hand end of the spindle 19 and connected thereto in a suitable manner. The lead screw 172 is adapted to be rotated in either direction and at different speeds from the spindle quill 163 through the medium of spur gears 175 and 176, the former of which is fixed to the left-hand end of the spindle quill while the latter is fixed to the right-hand end of a shaft 177 journaled in the spindle head and which forms the driving shaft of a feed speed change transmission, designated generally by the reference character S, housed within a suitable gear box in the spindle head. The gear 178 which forms the driving element of the feed change transmission S is operatively connected to a horizontal shaft 179 journaled in the spindle head through the medium of a gear 180 which forms the low speed element of an overrunning clutch transmission T similar to the transmission K previously described. The shaft 179 is adapted to be selectively rotated at a high rate of speed in either direction by the reversible rapid traverse motor 24, which motor is operatively connected to the high speed element 181 of the overrunning clutch transmission T.

The shaft 179 is adapted to be operatively connected to a horizontal shaft 182 journaled in the spindle head and extending substantially the length thereof through the medium of gears 183 and 184, the former of which is in mesh with a gear 185 journaled on the shaft 182 and the latter with a gear 186 which in turn meshes with a gear 187 also journaled on the shaft 182. The gear 186 is journaled on a jack shaft 188 and the gear 187 rotates in a direction opposite to the direction of rotation of the gear 185. The gears 185 and 187 are adapted to be selectively connected to the shaft 182 by a shiftable clutch element 189 splined on the shaft 182 between the gears 185 and 187, opposite ends of which clutch element are provided with clutch teeth adapted to cooperate with similar clutch teeth formed on the adjacent sides of the hub of the gears. The clutch element 189 is normally maintained in an intermediate or neutral position by a pair of springs 190 and 191 but is adapted to be shifted towards the left to drive the shaft 182 from the gear 185 or towards the right to connect the gear 187 with the shaft 182 by electric solenoids 192 and 193, respectively.

The armature of the solenoid 192 is connected to a slidable member 194 provided with an inclined cam slot 195 within which a roller carried by a longitudinally slidable rod 196 engages. The armature of the solenoid 193 is connected to the bar 196 in a manner similar to that in which the armature of the solenoid 192 is connected thereto, except for the fact that the cam slot 197 in the member 198 corresponding to the member 194 is inclined in the opposite direction to the slot 195. The lower ends of the cam slots are widened so that the operation of one of the members 194 and 198 will not be interfered with by the other. The slidable member 196 has a clutch yoke fixed to the right-hand end thereof which engages in a groove formed in the shiftable clutch member 189. The bar 196 is normally held in such a position that the clutch element 189 is in neutral position by the springs 190 and 191 which are located in a cut-out portion of the bar and engage opposite sides of a stationary stop fixed to the frame of the machine.

The left-hand end of the shaft 182 is connected to a gear 199 journaled thereon through the medium of an automatic release overload clutch 200. The gear 199 constitutes the driving gear of change gears, designated generally by the reference character U, the driven gear 201 of which is fixed to the end of the lead screw 172.

Adjacent to its right-hand end, the shaft 182 is operatively connected to a spindle feed hand wheel 202, a crank 203 and fixed and adjustable dials, etc., as is known in the art. The mechanism shown per se forms no part of the present invention, is similar to that described in the aforesaid copending application of H. M. Lucas et al., Serial No. 243,616 and will not be described in detail. Like the machine shown in said application the present machine includes two spindle limit switches 204 and 205 adapted to be opened by an adjustable trip 206. The switches 204 and 205 are secured to the rear side of the front of the spindle head and the construction is such that the spindle feed can be automatically stopped at any desired point by setting an adjustable dial which carries the trip 206.

The backrest block G is adapted to be clamped to and unclamped from the ways 16 of the column D by the electric motor 25 carried thereby. The circuit to the motor 25 is controlled by a double throw clamp switch 230, not shown on the machine, operatively connected to a lever 231 which operates the spindle head clamp in such a manner that when the lever 231 is in a position to clamp the spindle head C to the column B the normally open circuit therethrough is closed, and vice versa. The construction is such that the motor 25 is operated to clamp and unclamp the backrest block simultaneously with the clamping and unclamping of the spindle head C. The circuit to the motor 25 includes a normally open backrest block clamp motor limit switch 232 fixed to a clamp plate 233 and operated by a pivoted lever 234, one end of which engages a threaded gear member 235. The circuit through the switch 232 is maintained closed by the lever 234 while the backrest block is clamped to the column D. The control for the motor 25 is also interlocked with the main control in such a manner that the solenoid 92 cannot be actuated to connect the lead screws 18 and 20 which raise and lower the spindle head and backrest block, respectively, with the feed rapid traverse motor 21 while the spindle head and backrest block are clamped to the columns B and D, respectively.

The backrest column D may be moved along the horizontal ways 12 and 13 of the bed A either manually or by a motor 26, not shown on the machine, the operation of which motor is adapted to be controlled by two normally open push button switches 237 and 238 located on the front side of the backrest column D underneath a manual lever 239, adapted to clamp the backrest column to the ways 12 and 13 in any adjusted position. The construction is such that the push button switches 237 and 238 cannot be operated unless the lever 239 is in a position to unclamp the backrest column from the ways.

In operation, after the desired feeds have been selected, the remaining operations of the machine are controlled from the electrical control station H previously referred to. The various selecting switches, push button switches, etc., of the control station H are so arranged that their position corresponds to the direction of movement initiated or controlled thereby.

The electrical control station H has twenty-one push buttons and four selecting switches. The feed push buttons for the head, saddle, and table are arranged in groups and are located to give directional control. In other words, the button of each feed is on the side in a direction in which the feed will take place when the button is pressed. Each group has two continuous feed push buttons and two "inch" push buttons. In the center of each group is a selecting switch which, when turned on, makes the push buttons in that particular group operative and cuts out through relays all other groups of feed buttons and selecting switches. The selecting switches also make operative only the limit switches for the particular unit or element selected and cut out the limit switches for the other units or elements. This arrangement makes it possible to leave one or more of the units on a limit switch and move another unit as desired. When any one of the above-mentioned selecting switches is turned on and the circuit therethrough established, a white pilot light, located adjacent to that particular switch, lights. This tells at a glance which group of push buttons is operative. The two continuous feed buttons in each group also have light bulbs therein which light when the push button is pressed momentarily and remain lighted so long as the feed is operating. This indicates which unit is being fed and in what direction. One of the principal features of the present control resides in the fact that under no circumstances can either the head, saddle or table be connected to the feed and rapid traverse motor 21 other than the one indicated by the indicating lights, so that the operator always knows which, if any, of the units is operative.

In the embodiment of the invention shown, the spindle head continuous feed and "inch" feed push buttons are designated by the reference characters 240 and 241, and 242 and 243, respectively. These buttons, together with the selecting switch 244 and the indicating light 245 associated therewith, are grouped together and the continuous feed button 240 which causes the spindle head C to move in an upward direction is located above the continuous feed button 241 which initiates a continuous feed in a downward direction. The same is true of the "inch" push buttons 242 and 243. In a similar manner the saddle continuous feed and "inch" feed buttons 246 and 247, and 248 and 249, and the selecting switch 250 and indicating light 251 associated therewith are grouped together adjacent to the lower end of the front panel of the control station H. Since the saddle E moves longitudinally of the machine, the push button 246 which initiates a movement of the saddle towards the right is located at the right-hand side of the panel, while the push button 247 which initiates a movement in the opposite direction is located adjacent to the left-hand side thereof. The same is true of the "inch" feed buttons 248 and 249.

The table continuous feed and "inch" feed buttons 252 and 253, and 254 and 255, respectively, and the selecting switch 256 and the indicating light 257 associated therewith are located adjacent to the lower end of the right-hand side panel of the electrical control station. Since the table F moves transversely of the machine, these buttons are grouped on the right-hand side panel of the control station, and the continuous feed button 253 which initiates a movement towards the rear is located to the rear side of the panel, while the continuous feed button 252 which initiates a movement of the table towards the front is located adjacent the front side of the panel. The same is true of the "inch" feed buttons 254 and 255. None of the continuous feed push button switches are operative unless the spindle is rotating.

The selecting switches 244, 250 and 256, besides separating electrically the particular unit selected from the other units, energize the solenoids 92, 55 and 65, respectively, connecting the particular unit selected to the feed and rapid traverse motor 21, thus selecting the unit to be moved by power. The respective solenoid will remain energized so long as the selecting switch associated therewith is turned on except during the time that an "inch" or "jog" feed push button switch 258, hereinafter referred to, located on the bed A is depressed. All the controls located on the pendant control station H are rendered inoperative during the time jog push button switch 258 is depressed. After the push button switch 258 has been released, the selection remains as it was prior to pushing the switch, but spindle rotation and any continuous feed which may have been operating is no longer in operation, and if it is desired to continue the previous feed, it must again be started by depressing the particular feed push button in question. To aid the springs 58, 71 and 94 in disengaging the respective clutches, one of the idle solenoids is momentarily energized, in a manner hereinafter described, when the selecting switch associated therewith is turned "off" or jog push button switch 259 depressed, thus pulling the clutch into a neutral position.

A single push button switch 260 is employed for controlling the rapid traverse movements of the head, saddle, and table. This push button switch is located on the front panel of the pendant control station and, upon being depressed, closes the circuit to the solenoid 36 through relays in a manner hereinafter referred to, connecting the shaft 47 to the motor 21 through the friction clutch L, etc. The rapid traverse is not effected unless the feed for the particular element or unit that it is desired to rapid traverse is in operation, and, when initiated the rapid traverse will be in the direction of the feed movement. When desired all feeds including the spindle feed can be stopped by depressing a stop all feeds push button switch. All feeds and the spindle rotation can be stopped by depressing the stop all feeds and spindle rotation push button switch 261 projecting from the bottom of the pendant control.

The fourth selecting switch 262 of the pendant control station H is the spindle feed directional switch. When this switch is turned to the right, the spindle feed, when operated, will be to the right, and when turned to the left, the direction of feed will be to the left. The spindle feed is initiated by a spindle feed push button switch 263 located adjacent the selecting switch 262, both of which switches are located adjacent to the upper end of the front panel of the pendant control station H. Depressing the spindle feed push button 263 energizes one or the other of the solenoids 192 and 193, depending upon which direction of feed has been selected by the spindle feed direction selecting switch 262. Once the push button 263 has been depressed after the spindle feed directional switch 262 has been turned on, the circuit to the particular solenoid energized remains closed until the feed stop all feeds push button switch 261 is depressed or until the selecting switch 262 is turned off. The spindle start push button switch 263 has a light therein which is energized while the feed is operating, similar to the continuous feed push button switches previously referred to.

When the direction of rotation of the spindle 19 is reversed, the direction of feed for any given setup would naturally be reversed since the feed is driven from the spindle sleeve or quill. The selecting switch 262 would then no longer indicate the feed direction, but this is prevented by so wiring the machine that reversing of the direction of the spindle also transposes the spindle feed solenoids 192 and 193 so that when the spindle feed switch 263 is again depressed, the opposite solenoid will be energized and the feed will be in the same direction as previously selected.

The two push buttons 264 and 265 for controlling the rapid traverse motor 24 are so mounted in the front panel of the pendant control station H that when the right-hand button 264 is depressed, the spindle will be rapid-traversed to the right, and when the left-hand button 265 is depressed, the spindle will be rapid-traversed to the left. To make the spindle rapid traverse push buttons operative, however, the spindle feed selecting switch 242 must be in one of its "on" positions. The rapid traverse push buttons 264 and 265 always move the spindle in the aforesaid directions, that is, the button on the right always moves the spindle to the right and the button on the left always moves the spindle to the left irrespective of the direction of spindle feed selected by the spindle feed direction selecting switch 262. This is accomplished by having the spindle feed solenoid relays control the direction of rotation of the spindle rapid traverse motor 24.

Continuous rotation of the spindle 19 is controlled by three push button switches 266, 267 and 269. The first two button switches 266 and 267 cause the spindle to rotate in opposite directions, down in front and up in front, respectively. The third push button switch 269 "jogs" the spindle down in front. Depressing the push button switch 268 stops both motors 21 and 23. The jog push button 258 previously referred to jogs both the feed and rapid traverse motor 21 and the main motor 23. When the push button switch 258 is depressed slightly, all feeds are thrown out and the rotation of all motors is stopped. When depressed further, both motors 21 and 23 start and continue to run as long as the button is held in its extreme depressed position.

Figs. 12, 13, 14 and 15 are wiring diagrams of the electrical hook-up of the machine. Referring to these figures, it will be seen that all the push button switches employed, with the exception of the push button switches 237, 238, 260, 261, 264, 265 and 268 are double-throw switches having two or more sets of contacts, one or more sets normally closed and the other set or sets normally open. When the spindle forward push button switch 266 is depressed, a circuit is completed from the line L—1 through normally closed upper contacts of the jog push button switch 258, wire 271, normally closed contacts of the spindle stop push button switch 268, wire 272, normally closed contacts of the spindle jog push button switch 269, wire 273, normally closed contacts of the spindle forward push button switch 267, wire 274, normally open contacts of the push button switch 266, wire 275, operating solenoid 276 of relay 277, wire 278, and overload contacts 279 on motor control panel 280 which controls the motor 23, to line L—2.

Energization of the solenoid 276 closes the normally open contacts 282 and 283 of relay 277, the former of which completes a circuit from the line L—1 through jog push button switch 258, wire 271, spindle stop push button switch 268, wire 272, jog push button switch 269, wire 273, spindle forward push button switch 267, wire 274, contacts 282 of relay 277, wire 284, operating solenoid 285 of motor control panel 280, wire 278, and overload contacts 279 to L—2, thus energizing the operating solenoid 285 of motor control panel 280, closing the main contacts 286, 287, and 288 connecting the motor 23 to the main line L—1, L—2, and L—3, causing the motor to rotate in a direction to rotate the spindle 19 down in front, commonly referred to as forward. The second set of contacts 283 of relay 277 complete a holding-in circuit for the solenoid 276 of the relay 277 through the normally closed contacts of the spindle reverse push button 267, wire 274, contacts 283, wire 275, etc., which maintains the relay closed after the push button switch 266 has been released. The motor 23 continues to rotate until the solenoid 285 of the motor control panel 280 is deenergized, which may be accomplished by slightly depressing either of the jog push button switches 258 or 269, or the spindle stop push button switch 268 on the pendant control.

To rotate the main motor 23 and in turn the spindle 19 in the reverse direction, the spindle reverse push button switch 267 is depressed, closing the normally open contacts thereof and completing a circuit from the line L—1 through the normally closed contacts of the jog push button switch 258, wire 271, stop push button switch 268, wire 272, jog push button switch 269, wire 273, spindle forward push button switch 266, wire 289, normally open contacts of spindle reverse push button switch 267, wire 290, operating solenoid 291 of relay 292, wire 278, and overload contacts 279 to L—2. Energization of the operating solenoid 291 of relay 292 closes the normally open contacts 293, 294, 295, and 296, and opens the normally closed contacts 297 and 298. The closing of the normally open contacts 293 of relay 292 completes a circuit from the line L—1 through jog push button switch 258, wire 271, stop push button switch 268, wire 272, jog push button switch 269, wire 273, spindle forward push button switch 266, wire 289, contacts 293, wire 299, operating solenoid 300 of motor control panel 280, wire 278, and overload contacts 279 to L—2. Energization of the operating solenoid 300 of motor control panel 280 closes the main contacts 301, 302, and 303 thereof, connecting the motor 23 to the line, causing it to rotate in a direction to rotate the spindle up in front, commonly referred to as reverse. The motor 23 continues to rotate the spindle in the reverse direction until the operating solenoid 300 of the motor control panel 280 is deenergized in a manner previously referred to.

The spindle may be jogged in a forward direction by depressing the spindle jog push button switch 269 to close the normally open contacts thereof and complete a circuit from the line L—1 through jog push button switch 258, wire 271, spindle stop push button switch 268, wire 272, jog push button switch 269, wire 284, operating solenoid 285 of motor control panel 280, wire 278, and overload contacts 279 to line L—2. Energization of the operating solenoid 285 of motor control panel 280 closes the main contacts 286, 287, and 288 connecting the motor 23 to the line in such a manner that the motor rotates the spindle in a forward direction. The motor continues to operate as long as the jog push button switch 269 is depressed sufficiently to hold the normally open contacts thereof closed. The spindle rotation push button switches 266, 267 and the jog push button switch 269 are so interlocked that when the spindle is rotating continuously in either direction and it is desired to reverse the direction of rotation of the spindle, it is merely necessary to depress the desired push button switch.

The motor 23 can also be jogged by depressing the jog push button switch 258 located on the base of the machine far enough to close the normally open contacts thereof. The closing of these contacts establishes a circuit from the line L—1 through spindle and feed motor jog push button switch 258, wire 304, and operating solenoid 305 of relay 306 to L—2. The energization of the operating solenoid 305 of relay 306 closes the normally open contacts 308, 309 and 310 thereof, the former of which closes a circuit from the line L—1 through jog push button switch 258, wire 304, contacts 308, wire 284, operating solenoid 285 of the motor control panel 280, wire 278, and overload contacts 279 to line L—2. Energization of the operating solenoid 285 of motor control panel 280 operates the main contacts 286, 287 and 288 thereof to connect the motor 23 to the line to rotate the spindle forward. The closing of contacts 309 and 310 of relay 306 establishes circuits hereinafter more specifically referred to, which among other things, causes the feed and rapid traverse motor 21 to rotate.

The motor 23 is so constructed and wired that when the rotation thereof is stopped by depressing either of the push button switches 266 or 267, the motor is instantaneously brought to rest by being momentarily connected to the line in such a manner that it tends to rotate in the opposite direction. This is referred to as "plugging" and is accomplished in the present instance by a switch 312, comprising two sets of contacts 313 and 314 adapted to be selectively closed while the rotor of the motor is rotating depending upon the direction of rotation. In the present instance when the motor is rotating the spindle 19 forward, the contacts 313 are closed, whereas when the motor is rotating in reverse, the contacts 314 are closed. The contacts 313 of the switch 312 are in series circuit with a normally closed set of contacts 315 adapted to be opened upon energization of the operating solenoid 285 of the motor control panel 280. When the rotation of the motor 23 is stopped by depressing either of the push button switches 266 or 267, with the motor rotating in the forward direction, the operating solenoid 285 is deenergized and the motor disconnected from the line. Deenergization of the operating solenoid 285 allows the contacts 315 to close which completes a circuit from the line L—1 through jog push button switch 258, wire 271, stop all feeds and spindle rotation push button switch 268, wire 272, jog push button switch 269, wire 273, contacts 313 of switch 312, wire 311, contacts 315, wire 299, operating solenoid 300 of motor control panel 280, etc., to line L—2 so long as the motor 23 continues to rotate in a forward direction. Energization of the operating solenoid 300 of the motor panel 280 closes the main contacts 301, 302 and 303 which tend to rotate the motor in the opposite direction.

The contacts 314 of switch 312 are in series circuit with a normally closed set of contacts 316 adapted to be opened upon energization of the operating solenoid 300 of the motor control panel 280. When either of the push button switches 266 or 267 is depressed with the motor rotating in the reverse direction, the operating solenoid 300 is deenergized and the motor disconnected from the line. Deenergization of the operating solenoid 300 allows the contacts 316 to close, establishing a circuit from the wire 273 through the contacts 314 of switch 312, wire 141, contacts 316, wire 284, operating solenoid 285, etc., of motor control panel 280 to line L—2 so long as the motor 23 continues to rotate in a reverse direction. Energization of the operating solenoid 285 of the motor control panel 280 closes the main contacts 286, 287 and 288, which tend to rotate the motor in the opposite direction. When the motor 23 is stopped by depressing either of the push button switches 258, 269 or 268, irrespective of the direction of rotation, the motor coasts or, in other words, the plugging is not effected until the push button is released, since these switches are in series with both sets of contacts of the switch 312.

Figure 9:
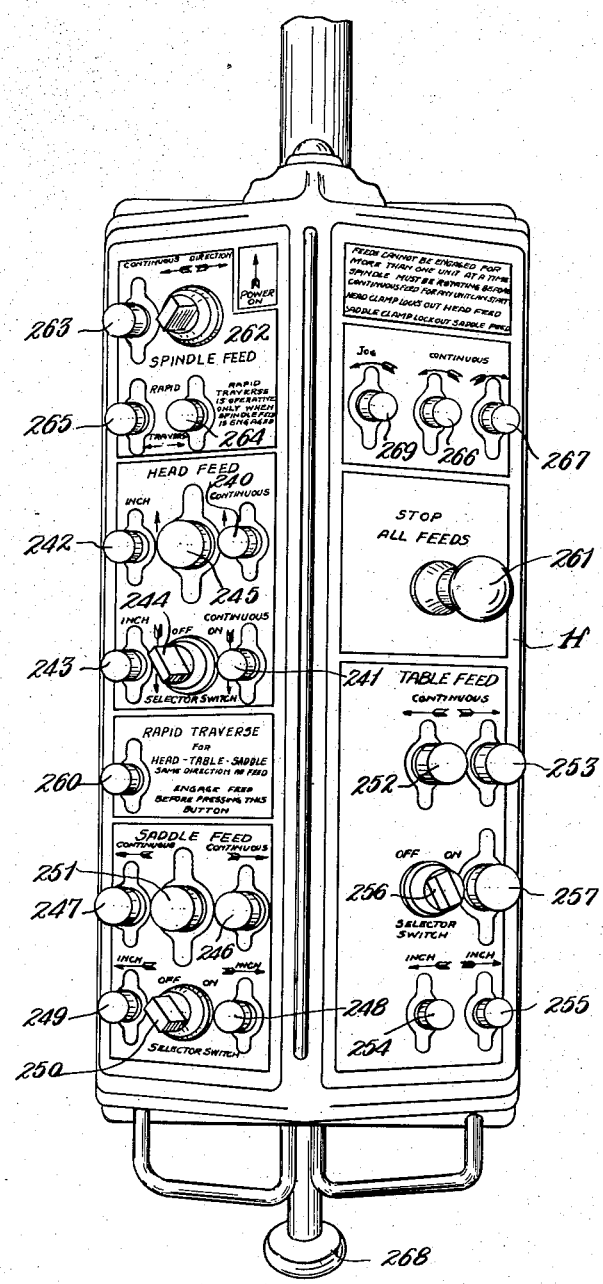
Fig. 9 is a view of the pendant control station.
Figure 10:
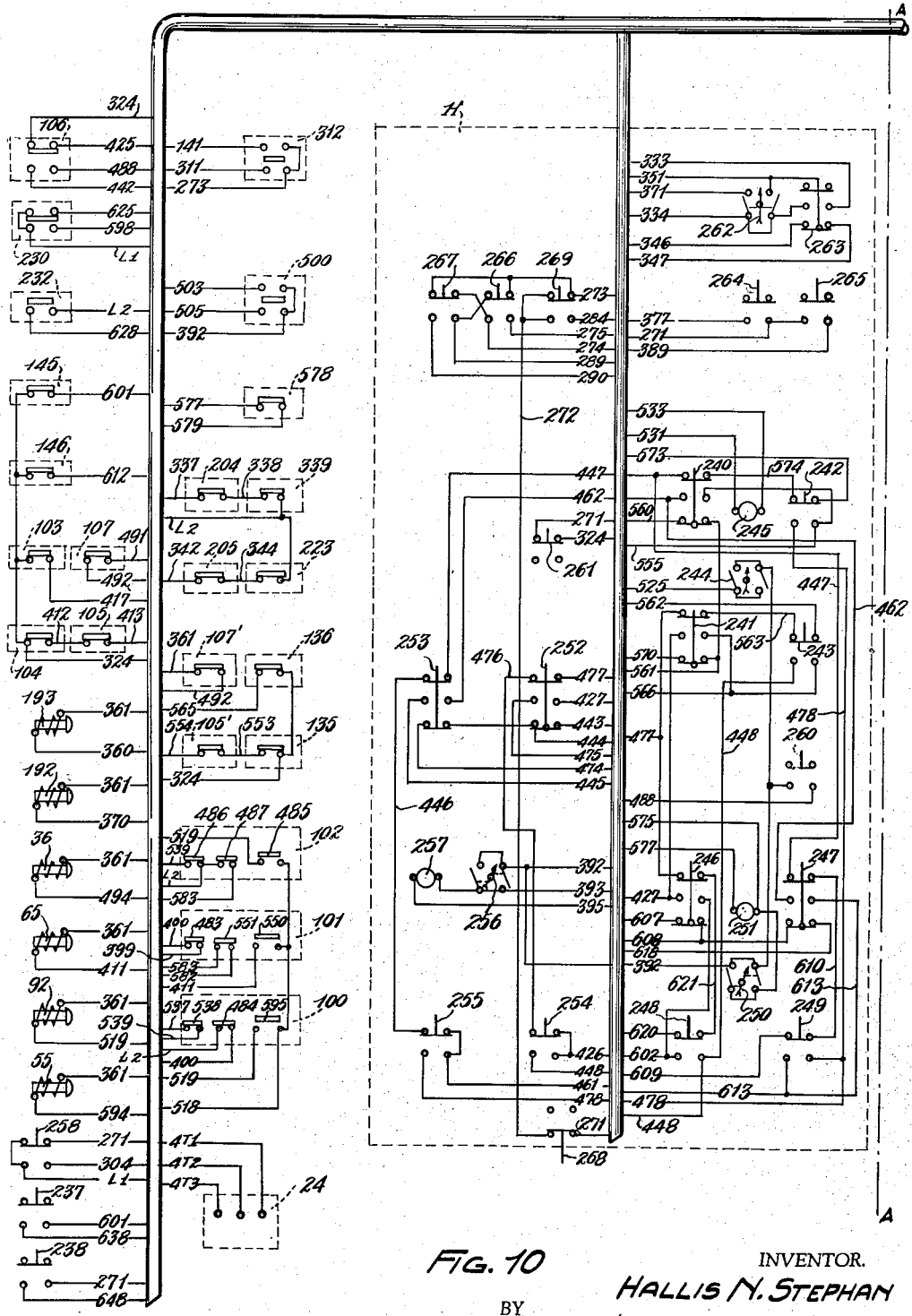
Figs. 10, 11, 12 and 13 are wiring diagrams of the electrical control.
Figure 11:
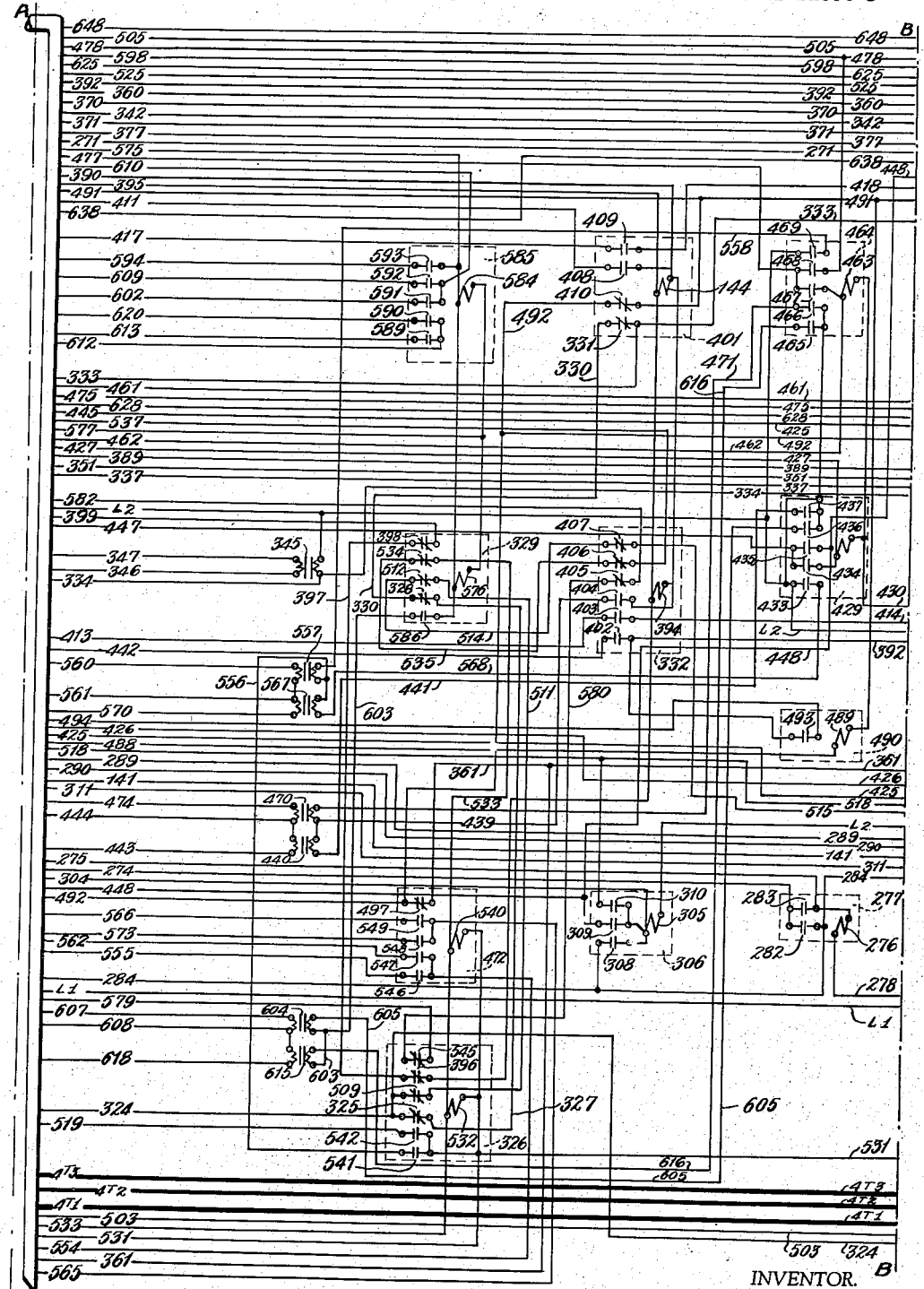
Figure 12:
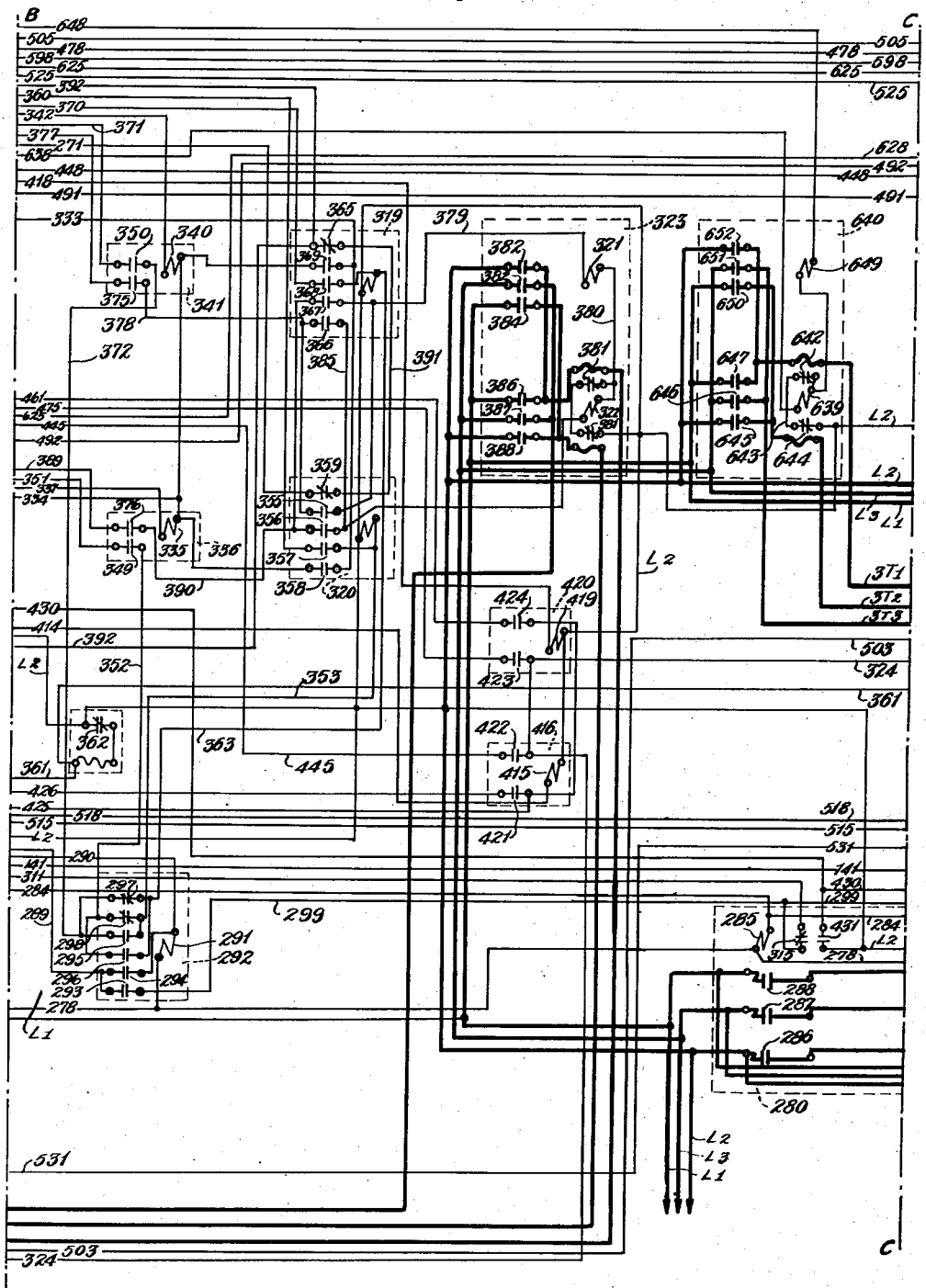
Figure 13:
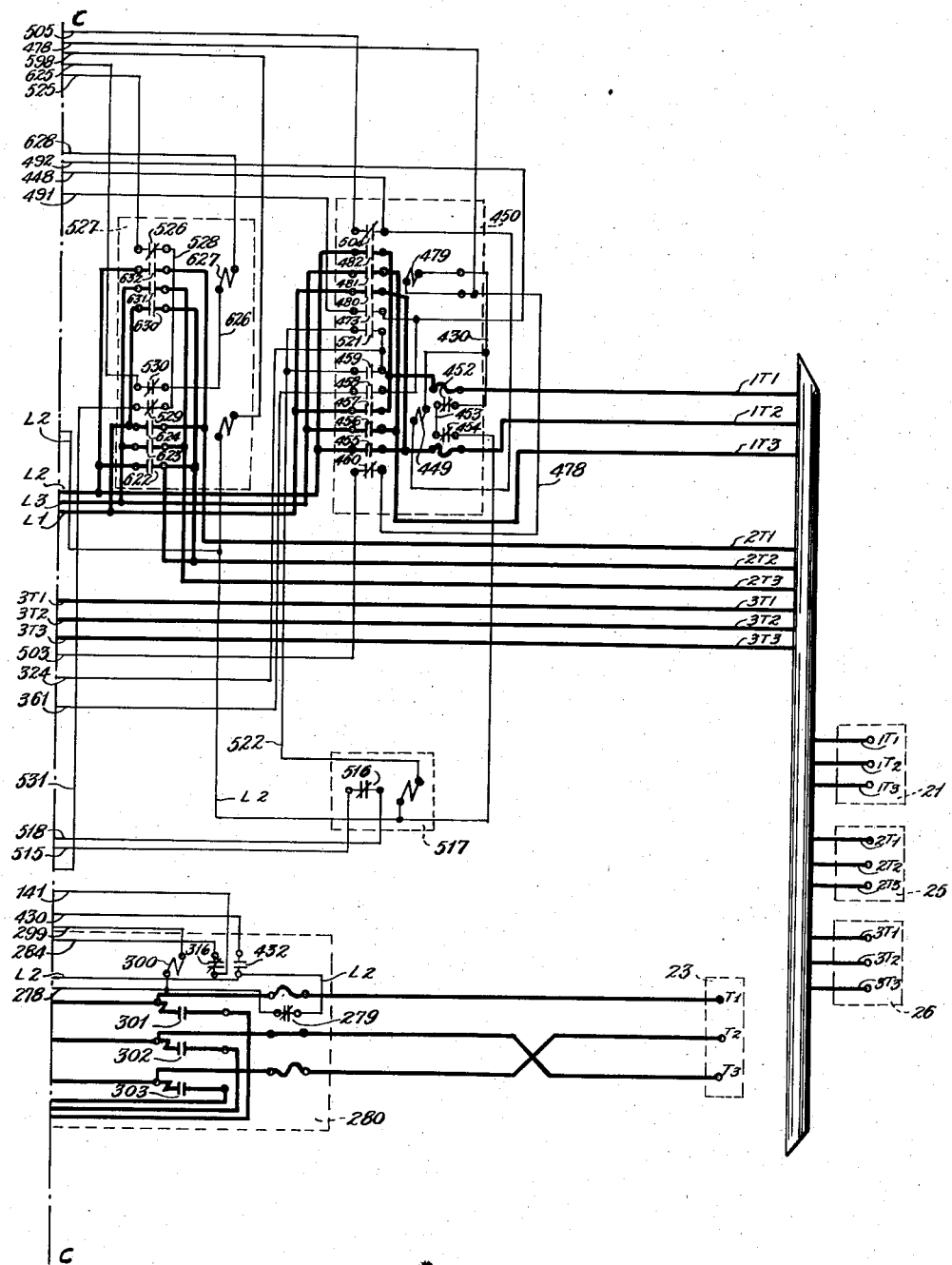

The spindle feed directional and the spindle rapid traverse controls are so designed that when the directional switch 262 is turned to the left as viewed in Fig. 9, or in other words, when the contacts 317 thereof are closed, the spindle feed is to the left regardless of the direction of rotation of the spindle 19. When the directional switch 262 is turned to the right, that is, to a position to close the contacts 318, the spindle feed is to the right, likewise, regardless of the direction of rotation of the spindle 19. This is accomplished through the medium of the contacts 295, 296, 297 and 298 of the relay 292, the former two of which contacts are normally open, while the latter two are normally closed. The operating solenoid 291 of the relay 292, as previously explained, is energized when the spindle is rotating in reverse and when energized causes a transposition of the control wires to relays 319 and 320, which in turn control the energization of the clutch operating solenoids 192 and 193, respectively. The spindle rapid traverse push button switches 264 and 265 always rapid traverse the spindle in the same direction regardless of the position of the directional switch 262, or the direction of rotation of the spindle 19. This is accomplished by a transposition of the control wires by the relays 319 and 320 to the operating solenoids 321 and 322 of the motor control panel 323 for the spindle rapid traverse motor 24. However, the switch 262 must be in one or the other of its two "on" positions before the rapid traverse push button switch 264 or 265 are operative.

With the foregoing in mind, the spindle 19 may be fed towards the left, or in a forward direction, by first turning the feed directional selecting switch 262 to its left-hand "on" position, and subsequently depressing the spindle feed push button 263. Turning the directional selecting switch to the left, closes the contacts 317 thereof, and upon depressing the spindle feed push button switch 263 a circuit is established from the line L—1, through jog push button switch 258, wire 271, stop all feeds push button switch 261, wire 324, normally closed contacts 325 of relay 326, wire 327, normally closed contacts 328 of relay 329, wire 330, normally closed contacts 331 of relay 401, wire 333, contacts of spindle start push button 263, wire 334, operating solenoid 335 of relay 336, wire 337, adjustable dial limit switch 204, wire 338, and limit switch 339 on the spindle head to L—2. At the same time a circuit is completed from wire 334 through the operating solenoid 340 of relay 341, wire 342, adjustable dial limit switch 205 on the spindle head, wire 344, and limit switch 223 to L—2, which circuit is connected in parallel with the circuit through the operating solenoid 335 of relay 336 and the limit switches 204 and 339. Simultaneously, a third circuit is completed from the wire 334 through transformer 345 to the line L—2. The secondary of the transformer 345 is connected by the wires 346 and 347 to the indicating light located in the spindle feed start push button switch 263. While the spindle 19 is being fed the light is energized regardless of the direction of feed.

Energization of the operating solenoids 335 and 340 of the relays 336 and 341, respectively, closes the normally open contacts 349 of relay 336 and the normally open contacts 350 of relay 341 in series circuit with the contacts 317 and 318, respectively, of the directional selecting switch 262. The closing of the normally open contacts 350 has no effect on the circuit, since these contacts are in series with contacts 318 of the directional selecting switch 262 which are now open.

The closing of the normally open contacts 349 of the relay 336 establishes a circuit from the wire 334 through contacts 317, wire 351, contacts 349, wire 352, contacts 298 of relay 292, wire 353, and operating solenoid 354 of relay 320 to L—2. Energization of the operating solenoid 354 of relay 320 closes the normally open contacts 355, 356, 357 and 358 and opens the normally closed contacts 359 thereof.

The closing of contacts 357 of relay 320 completes a circuit from the wire 353, through the contacts 357, wire 360, solenoid 193, wire 361, and normally closed solenoid overload contacts 362 to L—2. Energization of the solenoid 193 shifts the movable clutch element 189 to the right, as viewed in Fig. 7, that is, in a direction to feed the spindle to the left when the spindle is rotating in the forward direction. The closing of the normally open contacts 358 of relay 320 establishes a holding circuit for the relays 336 and 341 from the wire 333, through the contacts 358, wire 334, operating solenoids 335 and 340 of relays 336 and 341, respectively, and the limit switches 204, 339 and 205, 223, respectively. The holding circuit just referred to continues the feed after the spindle feed push button switch 263 is released. The spindle continues to feed forward until the holding circuit for relay 336 is broken either by the opening of one of the limit switches 204 or 339, by the directional selecting switch 262 being returned to its "off" position, or by the jog push button switch 258 or the stop all feeds push button switch 261 being depressed. When the holding circuit for the relay 336 is broken, the operating circuit for the solenoid 193 is in turn broken and the movable clutch element 189 allowed to return to its neutral position under the action of the spring 191.

Assuming that the spindle is rotating in the forward direction and that the feed direction selecting switch 262 is in its left-hand "on" position with the contacts 317 thereof closed, when the spindle feed start push button switch 263 is depressed, the spindle will feed towards the left, even though the direction of rotation of the spindle is reversed. This is accomplished by the relay 292, the operating solenoid 291 of which is energized while the spindle is rotating in the reverse direction, as previously explained.

Energization of the operating coil 291 of relay 292 opens the normally closed contacts 297 and 298 and closes the normally open contacts 295 and 296 thereof, connecting the wire 352 to wire 363 instead of to wire 353, as in the case when the spindle is rotating forwardly. When the spindle feed start push button switch 263 is depressed this establishes a circuit in addition to the circuits established through the relays 336 and 341, from the wire 334 through contacts 317 of direction selecting switch 262, wire 351, contacts 349 of relay 336, wire 352, contacts 295 of relay 292, wire 363, and operating solenoid 364 of relay 319 to line L—2. Energization of the operating solenoid 364 of relay 319 opens the normally closed contact 365 and closes the normally open contacts 366, 367, 368 and 369 thereof. The closing of contacts 368 of relay 319 establishes a circuit from the wire 363, through contacts 368, wire 370, solenoid 192, and wire 361, contacts 362 of solenoid overload relay 348 to L—2, energizing the solenoid 192 shifting the movable clutch element 189 towards the left, as viewed in Fig. 7, thus operatively connecting the gear 185 with the shaft 182. This would ordinarily rotate the lead screw 172 in the reverse direction, but since the direction of rotation of the spindle 19 has been reversed, the feed is in or to the left. The closing of contacts 369 establishes a holding circuit for relay 336 from wire 333 through contacts 369 to wire 334, thus maintaining relay 336 energized and also maintaining the solenoid 192 and the indicating transformer 345 energized. The spindle continues to feed towards the left as long as it is rotated until the holding circuit just mentioned is broken by either depressing the stop all feeds push button switch 261 or the jog push button switch 258 on the base of the machine, by returning the direction selecting switch 262 to "off" position, or by the opening of either of the limit switches 264 or 339. When the holding circuit for the relay 336 is broken, the operating circuit for the relay 319 and the solenoid 192 is in turn broken and the movable clutch element 189 allowed to return to its neutral position under the action of the spring 190.

Assuming now that it is desired to feed the spindle in the reverse direction or towards the right, the spindle feed selecting switch 262 is turned to its right "on" position closing the contacts 318 thereof. The spindle feed start push button switch 263 when depressed, establishes a circuit from the wire 333 of spindle start push button 263, wire 334, operating solenoid 335 of relay 336, wire 337, limit switch 204, wire 338, and limit switch 339 to L—2. At the same time a circuit is completed through the operating solenoid 340 of relay 341, wire 342 and limit switch 205, wire 344 and limit switch 223 to L—2. Simultaneously, a third circuit is completed from the wire 334, through the transformer 345 to the line L—2.

As previously explained, energization of the operating solenoids 335 and 340 of the relays 336 and 341, respectively, closes the normally open contacts 349 of relay 336 and the normally open contacts 350 of relay 341 in series circuit with the contacts 317 and 318, respectively, of the direction selecting switch 262. The closing of the normally open contacts 350 establishes a circuit from the wire 334 through contacts 318, wire 371, contacts 350, wire 372, normally closed contacts 297 of relay 292, wire 363, and operating solenoid 364 of relay 319 to L—2. Energization of the operating solenoid 364 of relay 319 closes the normally open contacts 366, 367, 368 and 369 and opens the normally closed contacts 365 thereof. The closing of the normally open contacts 368 of relay 319 completes a circuit from the wire 363, through the contacts 368, wire 370, and solenoid 192, wire 361, contacts 362 of solenoid overload relay 348 to L—2. Energization of the solenoid 192 shifts the movable clutch element 189 to the left, as viewed in Fig. 7, that is, in a direction to feed the spindle to the right when the spindle is rotating forwardly. The closing of the normally open contacts 369 of relay 319 establishes a holding circuit for the relays 336 and 341 from the wire 333, through the contacts 369, wire 334, operating solenoids 335 and 340 and limit switches 204, 339, and 205, 223, respectively. The holding circuit just referred to continues the feed after the spindle feed push button 263 is released. The spindle continues to feed to the right until the holding circuit for relay 341 is broken either by the opening of one of the limit switches 223 or 205, by returning the feed direction selecting switch 262 to "off" position, or by depressing the jog push button switch 258 or the stop all feeds push button switch 261. When the holding circuit for the relay 341 is broken, the operating circuits for the relay 319 and the solenoid 192 are in turn broken and the movable clutch element 189 allowed to return to its neutral position.

Assuming that the direction of rotation of the spindle 19 is reversed, nevertheless the direction of feed will be to the right when the spindle feed start push button switch 263 is depressed, so long as the feed direction selecting switch 262 is in its right-hand "on" position with the contacts 318 thereof closed. This is accomplished by the relay 292 in a manner similar to that referred to with reference to the feed towards the left. The operating solenoid 291 of the relay 292 is energized when the spindle is rotating in reverse direction, as previously explained, which opens the normally closed contacts 297 and closes the normally open contacts 295 connecting the wire 372 to wire 353 instead of wire 363. When the spindle feed start push button 263 is depressed, in addition to the circuits established through the relays 336 and 341, a circuit is established from the wire 334 through contacts 318 of direction selecting switch 262, contacts 350 of relay 341, contacts 295 of relay 292, wire 353, and operating solenoid 354 of relay 320 to line L—2. Energization of the operating solenoid 354 of relay 320 opens the normally closed contacts 359 and closes the normally open contacts 357 and 358 thereof. The closing of contacts 357 establishes a circuit from the wire 353, through the contacts 357, wire 360, and solenoid 193, wire 361, contacts 362 of solenoid overload relay 348 to L—2, energizing the solenoid 193 and shifting the movable clutch element 189 towards the right, as viewed in Fig. 7, thus operatively connecting the gear 187 with the shaft 182. This would ordinarily rotate the lead screw 172 in the reverse direction, but since the direction of rotation of the spindle 19 has been reversed, the feed is still to the right. The closing of contacts 358 establishes a holding circuit for relay 341 from wire 333 through contacts 358, wire 334, etc., thus maintaining the operating solenoid 340 of relay 341 energized and also maintaining the solenoid 193 and the indicating transformer 345 energized. The spindle continues to feed towards the right until the holding circuit just mentioned is broken by either depressing the stop push button switch 261 or the jog push button switch 258, by returning the feed direction selecting switch 262 to its "off" position, or by the opening of either of the limit switches 205 or 223. When the holding circuit for the relay 341 is broken, the operating circuits for relay 320 and solenoid 193 are in turn broken and the movable clutch element 189 allowed to return to its neutral position.

*Spindle rapid traverse*

The spindle 19 cannot be rapid traversed in either direction unless the direction selecting switch 262 is in one of its "on" positions and the spindle feed start push button 263 depressed, since the normally open contacts 375 of relay 341 are in series with the normally open contacts of spindle rapid traverse push button 264 and normally open contacts 376 of relay 336 are in series with the normally open contacts of rapid traverse push button switch 265. With the direction selecting switch 262 in either "on" position and the spindle start push button switch 263 having been depressed and released, the spindle can be rapid traversed towards the right by depressing the right-hand spindle rapid traverse push button switch 264 and toward the left by depressing the left-hand spindle rapid traverse push button 265. It is immaterial in which of the "on" positions the direction selecting switch 262 is positioned since either position actuates both relays 336 and 341. The spindle feed start push button must have been closed or depressed in order to make the rapid traverse operative since the rapid traverse push button switches 264 and 265 are in series circuit with normally open contacts of relays 319 and 320 and these relays can only be actuated to close the normally open contacts thereof by depressing the spindle feed start push button 263. After the spindle feed push button switch 263 has been initially closed, holding circuits heretofore referred to maintain the operating solenoids of the particular relay selected by the direction selecting switch 262 energized.

Assuming that the direction selecting switch 262 has been turned to its left-hand "on" position and the contacts 317 thereof closed and that the spindle feed start push button switch 263 has been depressed, the depressing of the right-hand spindle rapid traverse push button switch 264 to rapid traverse the spindle towards the right closes the normally open contacts thereof establishing a circuit from the line L—1 through normally closed contacts of jog push button switch 258, wire 271, spindle rapid traverse push button switch 264, wire 377, normally open contacts 375 of relay 336 which are now closed, wire 378, normally open contacts 355 of relay 320 which are now closed, wire 379, operating solenoid 321 of spindle rapid traverse motor control panel 323, wire 380, and normally closed overload contacts 381 of spindle rapid traverse motor control panel 323 to L—2. This energizes the operating solenoid 321 of rapid traverse motor control panel 323, closing the main contacts 382, 383 and 384, connecting the motor 24 to the line, causing the motor to rotate in a direction to rapid traverse the spindle to the right. Operation of the motor 24 continues until the rapid traverse push button switch 264 is released whereupon the rapid traverse of the spindle stops.

In the event that the spindle feed direction switch 262 is in its right-hand "on" position with the contacts 318 thereof closed, when the spindle rapid traverse push button switch 264 is depressed the spindle will, nevertheless, be rapid traversed towards the right, since in this event the operating solenoid 364 of the relay 319 will be energized rather than the operating solenoid 354 of the relay 320. When the right-hand spindle rapid traverse push button switch 264 is depressed, under these circumstances the circuit is established from the wire 378 through the contacts 366 of relay 319 which contacts are now closed, wire 385, operating solenoid 322 of rapid traverse motor control panel 323, wire 380, and normally closed overload contacts 381 to line L—2. Energization of the operating solenoid 322 of motor control panel 323 closes the main contacts 386, 387, 388 thereof, connecting the motor 24 to the line in such a manner that it rotates in the reverse direction but the direction in which the spindle is rapid traversed remains the same since the energization of the relay 319 instead of the relay 320 has in the interim reversed the position of the movable clutch element 189.

The spindle can be rapid traversed in the reverse direction or to the left in a manner similar to that in which it is rapid traversed towards the right by depressing the left-hand rapid traverse push button switch 265. When this push button switch is depressed with the spindle feed direction switch 262 in its left-hand "on" position with the contacts 317 thereof closed and the other necessary circuits set up by depressing the spindle start push button switch 263, a circuit is established from the wire 271, normally open contacts of push button switch 265, wire 389, normally open contacts 376 of relay 336 which contacts are now closed, wire 390, contacts 356 of relay 320 which contacts are now closed, wire 385, operating solenoid 322 of motor control panel 323, and wire 380, etc., to line L—2. Energization of the operating solenoid 322 of the motor control panel 323 closes the main contacts 386, 387, 388 thereof, causing the motor 24 to rotate in a direction to rapid traverse the spindle to the left.

With the spindle feed direction control switch 262 in the opposite "on" position, that is, with the contacts 318 thereof closed, depressing the left-hand spindle rapid traverse push button switch 265, establishes a circuit from the wire 271, through the normally open contacts of push button switch 265, wire 389, contacts 376 of relay 336, wire 390, contacts 367 of relay 319, wire 379, operating solenoid 321 of motor control panel 323, wire 380, etc., to line L—2. Energization of the operating solenoid 321 of rapid traverse motor control panel 323 closes the main contacts 382, 383 and 384 thereof, causing the motor to rotate in a reverse direction, but since the movable clutch element 189 has been shifted to its opposite position by the opening of relay 320 and the closing of relay 319, the spindle moves toward the left.

*Table control*

To move the table F, the selecting switch 256 is first turned to its "on" position. Assuming that the spindle feed is not operating, in which event contacts 359 and 365 are closed, and that the selecting switches 244 and 250 are "off", a circuit is then established from the line L—1 through jog push button switch 258, wire 271, normally closed contacts 359 of relay 320, wire 391, normally closed contacts 365 of relay 319, wire 392, selecting switch 256, wire 393, operating solenoid 394 of relay 332, wire 395, normally closed contacts 396 of relay 326, wire 397, and normally closed contacts 398 of relay 329, wire 399, normally closed contacts 483 of switch 101, wire 400, normally closed contacts 484 of switch 100 to L—2. In the event that either of the selecting switches 244 or 250 are turned on, or in the event that either of the clutches M or O are engaged for any reason, the contacts 483 and 484 of the switches 101 and 100, respectively, will be open, thus preventing the circuit from closing. Simultaneously, the operating solenoid 144 of relay 401 and the indicating light 257 are energized as they are connected in parallel with the operating solenoid 394 of relay 332. Energization of the operating solenoid 394 of relay 332 closes the normally open contacts 402, 403, and 404 and opens the normally closed contacts 405, 406 and 407 thereof. Energization of the operating solenoid 144 of relay 401 closes the normally open contacts 408 and 409 and opens the normally closed contacts 331 and 410 thereof. The closing of the contacts 408 of relay 401 establishes a circuit from the wire 393 through the contacts 408, wire 411, solenoid 65, wire 361, and contacts 362 of solenoid overload relay 348 to L—2. Energization of the solenoid 65 shifts the movable clutch element 64, engaging the clutch N and connecting the lead screw 60 with the motor 21, and closing the normally open contacts 485 of switch 102 and opening the normally closed contacts 486 and 487. The closing of normally open contacts 403 of relay 332 establishes a circuit from the line L—1 through jog push button switch 258, wire 271, stop all feeds push button switch 261, wire 324, table front limit switch 104, wire 412, index stop limit switch 105, wire 413, contacts 403, wire 414, and operating solenoid 415 of table limit relay 416 to L—2. Simultaneously a circuit is established from the wire 324 through the back limit switch 103, wire 417, contacts 409 of relay 332, wire 418, operating solenoid 419 of table limit relay 420 to L—2. Energization of the operating solenoid 415 of table limit relay 416 closes the normally open contacts 421 and 422 thereof. Energization of the operating solenoid 419 of table limit relay 420 closes the normally open contacts 423 and 424 thereof.

The table F can now be moved along the saddle E by depressing either of the "continuous" push buttons 252 and 253, or either of the "inch" push buttons 254 and 255. To feed the table F forward, the front "continuous" push button 252 is depressed, opening the normally closed contacts and closing the normally open contacts thereof. Closing of the normally open contacts establishes a circuit from the line L—1, through jog push button switch 258, wire 271, through the stop all feeds push button switch 261, wire 324, normally closed contacts of switch 106, wire 425, contacts 421 of relay 416, wire 426, normally open contacts of push button switch 252, wire 427, operating solenoid 428 of relay 429, wire 430, and either normally open contacts 431 or 432 of the motor control panel 280, depending upon the direction of rotation of the main driving motor 23, to line L—2. Energization of the operating solenoid 428 of relay 429 closes the normally open contacts 433, 434, 435, 436 and 437 thereof. The closing of contacts 437 of relay 429 closes a circuit from the wire 393 through the contacts 404 of relay 332, wire 439, transformer 440, wire 441, and contacts 437 to L—2, energizing the indicating light located in the push button 252, which indicating light is connected to the secondary of the transformer 440 by the wires 443 and 444.

The closing of contacts 434 of relay 429 establishes a holding circuit for the relay from the line L—2 through jog push button switch 258, wire 271, through the normally closed contacts of stop all feeds push button switch 261, wire 324, contacts 422 of relay 416, wire 445, normally closed contacts of push button switch 255, wire 446, normally closed contacts of continuous back push button switch 253, wire 447, contacts 434, wire 427, operating solenoid 428 of relay 429, wire 430, and contacts 431 or 432 of motor control panel 280 to line L—2. This holding circuit maintains the operating solenoid of the relay 429 energized after the push button switch 252 has been released. The closing of contacts 435 of relay 429 completes a circuit from the wire 447, through the contacts 435, wire 448, operating solenoid 449 of motor control panel 450, wire 451, overload contacts 452 of motor control panel 450, wire 453, and overload contacts 454 of motor control panel 450 to L—2. Energization of the operating solenoid 449 of the motor control panel 450 closes the main contacts 455, 456, and 457 thereof, connecting the feed and rapid traverse motor 21 to the main line in such a manner that the motor rotates in a direction to move the table towards the front. Simultaneously normally open contacts 458 and 459 of motor control panel 450 are closed and normally closed contacts 460 are opened.

The motor 21 continues to rotate as long as the holding circuit for the relay 429 is maintained and so long as the limit switches 104 and 105 remain closed. Upon the opening of either of the limit switches 104 or 105, jog push button switch 258, or stop all feeds push button switch 261, the circuit to the operating solenoid 449 of the motor control panel 450 is broken and the motor 21 disconnected from the line. Deenergizing the operating solenoid 428 of the relay 429 opens the primary circuit to the transformer 440 and extinguishes the light in the table continuous forward push button 252. The table F can be inched forward by depressing the "inch" forward push button switch 254. This closes a circuit from the line L—1, through jog push button switch 258, wire 271, stop all feeds push button 261, wire 324, rapid traverse switch 106, wire 425, contacts 421 of relay 416, wire 426, normally open contacts of push button switch 254, wire 448, operating solenoid 449 of motor control panel 450, etc. Energization of the operating solenoid 449 of the motor control panel 450 closes the main contacts 455, 456 and 457 thereof. causing the motor 21 to rotate in the same direction as previously referred to. The motor continues to rotate so long as the "inch" rear push button switch 254 is depressed.

The table F can be moved back continuously by depressing the back "continuous" push button switch 253. This establishes a circuit from the line L—1, through jog push button switch 258, wire 271, normally closed contacts of stop all feeds push button switch 261, wire 324, rapid traverse switch 106, wire 425, contacts 424 of relay 420, wire 461, normally open contacts of "continuous" back push button switch 253, wire 462, operating solenoid 463 of relay 464, wire 430, and either contacts 431 or 432 of motor control panel 280 to L—2. Energization of the operating solenoid 463 of relay 464 closes the normally open contacts 465, 466, 467, 468, and 469 thereof. The closing of contacts 466 of relay 464 reestablishes a circuit from the line L—1, through jog push button switch 258, wire 271, normally closed contacts 359 of relay 320, wire 391, normally closed contacts 365 of relay 319, wire 392, selecting switch 256, wire 393, contacts 404 of relay 332, wire 439, transformer 470, wire 471, and contacts 466 to L—2. Energization of transformer 470 energizes the indicating lamp in the "continuous" back push button switch 253, which lamp is connected to the secondary of the transformer 470 by the wires 444 and 474.

The closing of contacts 467 of relay 464 completes a holding circuit therefor from the line L—1, through jog push button switch 258, wire 271, normally closed contacts of stop push button switch 261, wire 324, normally open contacts 423 of relay 420, wire 475, normally closed contacts of "inch" front push button switch 254, wire 476, normally closed contacts of "continuous" front push button switch 252, wire 477, contacts 467, wire 462, operating solenoid 463 of relay 464, wire 430, and contacts 431 or 432 to line L—2. This holding circuit maintains the relay 464 energized after the "continuous" back push button switch 253 has been released. The closing of contacts 468 of relay 464 completes a circuit from wire 477, through contacts 468, wire 478, operating solenoid 479 of motor control panel 450, wire 451, overload contacts 452 of motor control panel 450, wire 453, and overload contacts 454 of motor control panel 450 to L—2. Energization of the operating solenoid 479 of motor control panel 450 closes the contacts 480, 481, and 482 thereof connecting the motor 21 to the line in such a manner that it rotates in a direction to move the table back. The motor continues to operate until the limit switch 103 is opened by the table reaching the end of its travel or until the feed stop push button switch 261 is depressed. When the motor is stopped, the holding circuit for relay 464 is broken and the indicating lamp in the continuous back push button 253 is extinguished. Energization of the operating solenoid 479 of motor control panel 450 opens the normally closed contacts 504 and closes the normally open contacts 473 and 521.

The table can be inched back by depressing the "inch" back push button switch 255 closing the normally open contacts thereof. This establishes a circuit from the line L—1, through jog push button switch 258, wire 271, normally closed contacts of push button switch 261, wire 324, switch 106, wire 425, normally open contacts 424 of relay 420, wire 461, normally open contacts of "inch" back push button switch 255, wire 478, operating solenoid 479 of motor control panel 450, etc., to L—2. Energization of the operating solenoid 479 of the motor control panel 450 causes the main contacts 480, 481 and 482 thereof to close, connecting the motor to the line. The motor continues to operate as long as the "inch" push button switch 255 is depressed sufficient to hold the normally open contacts thereof closed.

The spindle 19 must be rotating otherwise the table cannot be moved since the contacts 431 and 432 are only closed when the main motor 23 is rotating in one direction or the other. The table cannot be rapid traversed unless the feed and rapid traverse motor 21 is rotating. With the motors 23 and 21 rotating, the table can be rapid traversed in either direction, depending upon the direction of rotation of the motor 21 by merely depressing the normally open rapid traverse push button switch 260 to close the contacts thereof. This establishes a circuit from the line L—2, through jog push button switch 258, wire 271, normally closed contacts 359 of relay 320, wire 391, normally closed contacts 365 of relay 319, wire 392, rapid traverse push button switch 260, wire 488, and operating solenoid 489 of rapid traverse limit relay 490, wire 491, dial indicator rapid traverse table forward limit switch 107, wire 492, dial indicator rapid traverse spindle head up limit switch 107', wire 361, contacts 362 of solenoid overload relay 348 to L—2. Energization of the operating solenoid 489 of rapid traverse relay 490 closes the normally open contacts 493 thereof, completing a circuit from the wire 392, through the contacts 493, wire 494, solenoid 36, wire 361, contacts 362 of solenoid overload relay 348 to L—2. Energization of the solenoid 36 engages the normally disengaged friction clutch L, causing the lead screw 60 to be rotated at a comparatively high rate of speed through the overrunning clutch device K. When the rapid traverse push button switch 260 is released, the solenoid 36 is deenergized and the friction clutch L disengaged, thus stopping the rapid traverse movement.

The dial indicator rapid traverse table forward switch 107 is in parallel circuit with normally closed contacts 410 of relay 401 and normally open contacts 473 of motor control panel 450. The dial indicator rapid traverse up spindle head switch 107' is in parallel circuit with normally open contacts 458 of motor control panel 450 and normally closed contacts 497 of relay 472. The contacts 410 shunt out the switch 107 unless the circuit through the table selecting switch 256 is established, and the contacts 473 shunt out the switch 107 when the solenoid 479 of motor control panel 450 is energized and the motor 21 connected to the line in such a manner that it rotates in a direction to move the table back. This latter construction allows the table to be moved off the switch 107 at a rapid traverse rate. In a similar manner the contacts 497 shunt out the switch 107' unless the circuit through the head selecting switch 244 is established, and the contacts 485 permit the spindle head to be moved off of the switch 107' at a rapid traverse rate.

The motor 21, like the motor 23 heretofore referred to, is provided with a "plugger" for bringing the same to rest instantaneously upon being disconnected from the line. The "plugger" switch, designated generally by the reference character 500, comprises normally open contacts 501 adapted to be closed when the motor is rotating in the direction to move the table forward and normally open contacts 502 adapted to be closed when the motor 21 is rotating in the direction to move the table back. When the motor is rotating in a direction to move the table forward, the normally closed contacts 460 of motor control panel 450 are open. These contacts 460 are in series with the contacts 501 of the plugger 500. As soon as the motor 21 is disconnected from the line, the contacts 460 close, completing a circuit from the wire 392, through the contacts 501, wire 503, contacts 460, wire 478, operating solenoid 479 of motor control panel 450, etc., to line L—2 so long as the motor continues to rotate in a forward direction. Energization of the operating solenoid 479 of motor control panel 450 connects the motor to the main line in such a manner that it tends to rotate in a reverse direction and instantaneously comes to rest. When the motor comes to rest, the contacts 501 open, breaking the circuit to the operating solenoid 479 of the motor control panel 450. When the motor is rotating in a reverse direction, with the operating solenoid 479 of the motor control panel 450 energized, normally closed contacts 504 of motor control panel 450 are open and contacts 502 of "plugger" switch 500 in series therewith are closed. Contacts 504 close upon disconnecting the motor from the line, establishing a circuit from the wire 392, through contacts 502, wire 505, contacts 504, wire 448, operating solenoid 449 of motor control panel 450, etc., to the line L—2, reversing the motor. When the motor stops rotating, which is instantaneously, the circuit to the operating solenoid 449 is broken by the opening of the contacts 502 of the "plugger" switch 500.

When the selecting switch 256 is turned to its "off" position, the operating circuits to relays 332 and 401 and the circuit to the indicating light 257 are broken. This, in turn, opens the circuit to the solenoid 65, allowing the movable element of clutch N to return to its neutral or disengaged position under the action of the spring 71, disconnecting the lead screw 60 from the motor 21. In the event that the movable clutch element of the clutch N does not immediately return to its neutral position upon deenergization of the operating solenoid 65, a circuit is established through the solenoid 92 upon the opening of relay 332 which causes the contacts 407 thereof to close. The solenoid 92 thereupon pulls the movable clutch element of clutch N into disengaged position. As the clutch N disengages the circuit through solenoid 92 is opened as the normally open contacts 485 of switch 102 are in series therewith. The circuit referred to is from the line L—1, through push button switch 258, wire 271, push button switch 261, wire 324, normally closed contacts 509 of relay 326, wire 511, normally closed contacts 512 of relay 329, wire 514, contacts 407 of relay 332 which close upon deenergization of relay 332 by returning table selecting switch 256 to its "off" position, wire 515, normally closed contacts 516 of time delay switch 517 which do not close until the motor has come to rest, wire 518, normally open contacts 485 of switch 102, which are now closed, wire 519, solenoid 92, wire 361, and overload contacts 362 to line L—2. Energization of the solenoid 92 instantaneously pulls the movable element of the clutch N to its neutral position whereupon the contacts 485 of switch 102 open breaking the circuit to the solenoid 92.

For a short period of time after the table selecting switch 256 is turned "off," the motor 21 will continue to rotate. During this interval, the clutch N will be under load and the spring 71 may not be strong enough to move the movable element but may be strong enough to disengage the clutch after the motor has stopped rotating, for which reason it is not necessary or desirable to energize the solenoid 92 to pull the movable element of the clutch N into disengaged position until after the motor 21 has come to rest. The operation of the solenoid 92 is delayed by the solenoid time delay relay 517, the operating solenoid 520 of which is energized from the line 324 through normally open contacts 459 or 521 of motor control panel 450 and wire 522 while the motor 21 is connected to the line, the contacts 516 of which time delay relay do not close upon deenergization of the operating solenoid 520 until a sufficient time has elapsed to allow the motor 21 to come to rest. When the motors 21 and 23 are jogged by means of the jog push button switch 258 all of the control circuits are deenergized between the interval that the normally closed contacts of the jog push button switch are opened and the time the normally open contacts thereof are closed. In the event that the selecting switch 256 is "on" when the jog push button switch 258 is depressed, the solenoid 65 which operates the clutch N is deenergized. If the spring 71 is not sufficient to disengage the clutch, the circuit referred to immediately above for energizing the solenoid 92 cannot be completed since the wire 271 and in turn the wires 324 and 518 are disconnected from the line L—1. However, under these circumstances, the wire 518 is connected to the line L—1 and the circuit established through the contacts 310 of relay 306, the operating solenoid 305 of which is energized upon the closing of the normally open contacts of the jog push button switch 258, thus avoiding any possibility of the clutch N remaining engaged and interfering with the subsequent operation of the machine. Alternatively, that side of the contacts 509 of relay 332 which is connected to the line 324 could be connected direct to the line L—1, in which event the contacts 310 of relay 306 could be disposed of. In this event the circuit through the solenoid 92 for pulling the clutch N into neutral position would be independent of the operation of the jog push button switch 258, and upon interrupting the circuit through solenoid 65 by depressing the jog push button switch 258, the circuit through the solenoid 92 would be established upon the contacts 516 of time delay relay 517 closing irrespective of whether or not the normally open contacts of jog push button switch 258 were closed.

From the foregoing description of the table control it will be apparent that the table can be moved in any desired direction provided the spindle 19 is rotating and the selecting switches 244, 250 and 262 which control the movement of the spindle head and backrest block, saddle, and spindle, respectively, are in their "off" positions, by turning the selecting switch 256 to its "on" position and depressing the desired push button on the pendant control station H.

A "jump feed" can be obtained, that is, the table can be automatically caused to move at a rapid traverse rate while being fed in either direction if desired, by adjusting stops 116 and 118 only two of which are shown on the drawings. However, it is to be understood that any number or combination thereof may be employed. The stop or stops 118 cause the normally closed contacts of table "jump feed" rapid traverse switch 106 to be opened and the normally open contacts thereof to be closed as it passes the end of the lever 114, as previously described. In the event the table selecting switch 256 is "on" when the normally open contacts of table "jump feed" rapid traverse switch are closed, a circuit is established from the line 392, through the normally open contacts 402 of relay 332, which is now closed, wire 442, switch 106, wire 488, operating solenoid 489 of rapid traverse relay 490, wire 491, table dial indicator rapid traverse forward limit switch 107, wire 492, etc., to L—2. Energization of the solenoid 489 of the rapid traverse relay 490 energizes the rapid traverse clutch solenoid 36. The table continues to move at a rapid traverse rate until the upper end of the lever 114 is lowered either manually or by engagement with one of the cam surfaces 108 or 115 on a stop such as one of the stops 109, 111, or 116. The table can be repeatedly stopped at a predetermined point while moving in the forward direction or indexed to predetermined points while moving in the forward direction through the medium of the table dial indicator rapid traverse forward limit switch 107 and the table dial indicator forward stop limit switch 105 as previously described. When the table dial indicator rapid traverse forward limit switch 107 is opened the rapid traverse friction clutch solenoid is deenergized irrespective of whether the rapid traverse movement is being caused by the fact that the normally open contacts of table jump feed rapid traverse switch 106 are closed or whether it is being effected through the medium of the rapid traverse push button switch 260 on the pendant control station H. When the table dial indicator stop limit switch 105 is opened by continued movement of the table at feed rate, the table stops instantaneously because of the plugging circuits associated with the motor 21.

Depressing the stop push button switch 261 while the table is operating in rapid traverse, breaks the holding-in circuit for the solenoid of the motor control panel 450 which is energized depending upon the direction of rotation of the motor. This stops the table movement but the normally closed contacts of table jump feed rapid traverse switch 106 remain open and the switch 106 must be reset by means of the manual lever 119 before the machine can be started again by either of the continuous push button switches 252 or 253, thus preventing the table from starting up in rapid traverse upon either of the continuous feed push button switches being depressed. The fact that the normally open contacts 402 of relay 332 are in series circuit with the normally open contacts of the switch 106 prevents any possibility of the table being moved unless the table selecting switch 256 is "on."

*Spindle head and backrest block control*

To move the spindle head and backrest block, the selecting switch 244 is first turned to its "on" position. Assuming that the spindle feed is not operating and that the selecting switches 250 and 256 are "off," a circuit is then established from the line L—1 through jog push button switch 258, wire 271, normally closed contacts 359 of relay 320, wire 391, normally closed contacts 365 of relay 319, wire 392, selecting switch 244, wire 525, normally closed contacts 526 of motor control panel 527, wire 528, normally closed contacts 529 of motor control panel 527, wire 531, operating solenoid 532 of relay 326, wire 533, normally closed contacts 534 of relay 329, wire 535, and normally closed contacts 406 of relay 332, wire 537, normally closed contacts 538 of switch 100, wire 539, normally closed contacts 486 of switch 102 to L—2. In the event that either of the clutches M or N are engaged for any reason, the contacts 486 and 538 of the switches 102 and 100, respectively, will be open thus preventing the circuit from closing. Simultaneously, the operating solenoid 540 of relay 472 and the indicating light 245 are energized as they are connected in parallel with the operating solenoid 532 of relay 326. Energization of the operating solenoid of relay 326 closes the normally open contacts 541 and 542 and opens the normally closed contacts 509, 325, 396 and 545 thereof. Energization of the operating solenoid 540 of relay 472 closes the normally open contacts 546, 547, 548 and 549 and opens the normally closed contacts 497 thereof. The closing of the contacts 542 of relay 326 establishes a circuit from the wire 531 through the contacts 542, wire 519, solenoid 92, wire 361, and solenoid overload contacts 362 to L—2. Energization of the solenoid 92 shifts the movable clutch element 86, engaging the clutch O and connecting the lead screws 18 and 20 with the motor 21, and closing the normally open contacts 550 of switch 101 and opening the normally closed contacts 483 and 551.

The spindle head and backrest block can now be moved by depressing either of the "continuous" push buttons 240 and 241, or either of the "inch" push buttons 242 and 243. To feed the members up, the up "continuous" push button 240 is depressed, opening the normally closed contacts and closing the normally open contacts thereof. Closing of the normally open contacts establishes a circuit from the line L—1, through jog push button switch 258, wire 271, through the stop all feeds push button switch 261, wire 324, "up" feed and rapid traverse limit switch 135, wire 553, dial indicator feed up limit switch 105', wire 554, contacts 546 of relay 472, wire 555, normally open contacts of push button switch 240, wire 462, operating solenoid 463 of relay 464, wire 430, and either normally open contacts 431 or 432 of the motor control panel 280, depending upon the direction of rotation of the main driving motor 23, to line L—2. The closing of contacts 469 of relay 464 closes a circuit from the wire 531 through contacts 541 of relay 326, wire 556, transformer 557, wire 558, and contacts 469 to L—2, energizing the indicating light located in the push button 240, which indicating light is connected to the secondary of the transformer 557 by the wires 560 and 561.

The closing of contacts 467 of relay 464 completes a holding circuit therefor from the line L—1 through jog push button switch 258, wire 271, normally closed contacts of stop push button switch 261, wire 324, "up" feed and rapid traverse limit switch 135, wire 553, dial indicator feed up limit switch 105', wire 554, normally open contacts 547 of relay 472, wire 562, normally closed contacts of "inch" down push button switch 243, wire 563, normally closed contacts of "continuous" down push button switch 241, wire 477, contacts 467, wire 462, operating solenoid 463 of relay 464, wire 430, and contacts 431 or 432 to line L—2. This holding circuit maintains the relay 464 energized after the "continuous" up push button switch 240 has been released. The closing of contacts 468 of relay 464 completes a circuit from wire 477, through contacts 468, wire 478, operating solenoid 479 of motor control panel 450, wire 451, overload contacts 452 of motor control panel 450, wire 453, and overload contacts 454 of motor control panel 450 to L—2. Energization of the operating solenoid 479 of motor control panel 450 closes the contacts 480, 481, and 482 thereof connecting the motor 21 to the line in such a manner that it rotates in a direction to move the spindle head and backrest block up. The motor continues to operate until the limit switch 552 is opened by the spindle head reaching the end of its travel or until the feed stop push button switch 261 is depressed. When the motor is stopped, the holding circuit for relay 464 is broken and the indicating lamp in the continuous up push button switch 240 is extinguished.

The spindle head and backrest block can be inched up by depressing the "inch" up push button switch 242 closing the normally open contacts thereof. This establishes a circuit from the line L—1, through jog push button switch 258, wire 271, normally closed contacts of push button switch 261, wire 324, "up" feed and rapid traverse limit switch 135, wire 553, dial indicator feed up limit switch 105', wire 554, normally open contacts 546 of relay 472, wire 555, normally open contacts of "inch" up push button switch 242, wire 478, operating solenoid 479 of motor control panel 450, etc., to L—2. Energization of the operating solenoid 479 of the motor control panel 450 causes the main contacts 480, 481 and 482 thereof to close, connecting the motor to the line. The motor continues to operate as long as the "inch" up button switch 242 is depressed sufficient to hold the normally open contacts thereof closed.

The spindle head and backrest block can be moved down continuously by depressing the down "continuous" push button switch 241. This establishes a circuit from the line L—1, through jog push button switch 258, wire 271, normally closed contacts of stop all feeds push button switch 261, wire 324, spindle head down limit switch 136, wire 565, contacts 549 of relay 472, wire 566, normally open contacts of "continuous" down push button switch 241, wire 427, operating solenoid 428 of relay 429, wire 430, and either contacts 431 or 432 of motor control panel 280 to L—2. The closing of contacts 433 of relay 429 establishes a circuit from wire 531, contacts 541 of relay 326, wire 556, transformer 567, wire 568, and contacts 433 to L—2. Energization of transformer 567 energizes the indicating lamp in the "continuous" down push button switch 241, which lamp is connected to the secondary of the transformer 567 by the wires 570 and 561.

The closing of contacts 434 of relay 429 establishes a holding circuit for the relay from the line L—2, through jog push button switch 258, wire 271, through the normally closed contacts of stop all feeds push button switch 261, wire 324, head down limit switch 136, wire 565, contacts 548 of relay 472, wire 573, normally closed contacts of push button switch 242, wire 574, normally closed contacts of continuous up push button switch 240, wire 447, contacts 434, wire 427, operating solenoid 428 of relay 429, wire 430, and contacts 431 or 432 of motor control panel 280 to line L—2. This holding circuit maintains the operating solenoid of the relay 429 energized after the push button switch 252 has been released. The closing of contacts 435 of relay 429 completes a circuit from the wire 447, through the contacts 435, wire 448, operating solenoid 449 of motor control panel 450, wire 451, overload contacts 452 of motor control panel 450, wire 453, and overload contacts 454 of motor control panel 450 to L—2. Energization of the operating solenoid 449 of the motor control panel 450 connects the feed and rapid traverse motor 21 to the main line in such a manner that the motor rotates in a direction to move the spindle head down. Simultaneously normally open contacts 458 and 459 of motor control panel 450 are closed and normally closed contacts 460 are opened.

The motor 21 continues to rotate as long as the holding circuit for the relay 429 is maintained and so long as the limit switch 136 remains closed. Upon the opening of either the limit switch 136, jog push button switch 258, or stop all feeds push button switch 261, the circuit to the operating solenoid 449 of the motor control panel 450 is broken and the motor 21 disconnected from the line. Deenergizing the operating solenoid 428 of the relay 429 opens the primary circuit to the transformer 567 and extinguishes the indicating light. The spindle head and backrest block can be inched down by depressing the "inch" down push button switch 243. This closes a circuit from the line L—1, through jog push button switch 258, wire 271, stop all feeds push button 261, wire 324, spindle head down limit switch 136, wire 565, contacts 549 of relay 498, normally open contacts of push button switch 243, wire 448, operating solenoid 449 of motor control panel 450, etc. Energization of the operating solenoid 449 of the motor control panel 450 causes the motor 21 to rotate in the same direction as previously referred to. The motor continues to rotate so long as the "inch" down push button switch 243 is depressed.

The spindle 19 must be rotating otherwise the spindle head, etc., cannot be moved since the contacts 431 and 432 are only closed when the main motor 23 is rotating in one direction or the other. With the motors 23 and 21 rotating, the spindle head can be rapid traversed in either direction, depending upon the direction of rotation of the motor 21 by merely depressing the normally open rapid traverse push button switch 260 to close the contacts thereof. This establishes a circuit from the line L—2, through jog push button switch 258, wire 271, normally closed contacts 359 of relay 320, wire 391, normally closed contacts 365 of relay 319, wire 392, rapid traverse push button switch 260, wire 488, and operating solenoid 489 of rapid traverse relay 490, wire 491, table dial indicator rapid traverse forward limit switch 107, wire 492, spindle head dial indicator rapid traverse "up" limit switch 107′, wire 361, contacts 362 to L—2. Energization of the operating solenoid 489 of rapid traverse relay 490 closes the normally open contacts 493 thereof, completing a circuit from the wire 392, through the contacts 493, wire 494, solenoid 36, wire 361, contacts 362 to L—2. Energization of the solenoid 36 engages the normally disengaged friction clutch L, causing the lead screws 18 and 20 to be rotated at a comparatively high rate of speed through the overrunning clutch device K. When the rapid traverse push button switch 260 is released, the solenoid 36 is deenergized and the friction clutch L disengaged, thus stopping the rapid traverse movement.

As previously stated, spindle head switch 107′ is in parallel circuit with normally open contacts 473 of motor control panel 450 and normally closed contacts 410 of relay 401. The contacts 410 shunt out the table switch 107 unless the circuit through the table selecting switch 256 is established, and the contacts 473 shunt out the table switch 107 when the solenoid 479 of motor control panel 450 is energized and the motor 21 so connected to the line in such a manner that it rotates in a direction to move the table back. This latter construction allows the table to be moved off the table switch 107 at a rapid traverse rate. The contacts 497 shunt out the spindle head dial indicator rapid traverse forward limit switch 107′ unless the circuit through the head selecting switch 244 is established, and the contacts 458 permit the spindle head to be moved off of the spindle head dial indicator rapid traverse "up" limit switch 107′ at a rapid traverse rate.

When the selecting switch 244 is turned "off," the operating circuits to relays 326 and 472 and the circuit to the indicating light 245 are broken. This, in turn, opens the circuit to the solenoid 92, allowing the movable element of clutch O to return to its neutral or disengaged position under the action of the spring 94, disconnecting the lead screws 18 and 20 from the motor 21. In the event that the movable clutch element of the clutch O does not immediately return to its neutral position upon deenergization of the operating solenoid 92, a circuit is established through the solenoid 65 upon the opening of relay 326 which causes the contacts 509 thereof to close. The solenoid 65 thereupon pulls the movable clutch element of clutch O into disengaged position. As the clutch O disengages, the circuit through solenoid 65 is opened as the normally open contacts 550 of switch 101 are in series therewith. The circuit referred to is from the line L—1, through push button switch 258, wire 271, push button switch 261, wire 324, normally closed contacts 509 of relay 326, wire 511, normally closed contacts 512 of relay 329, wire 514, contacts 407 of relay 332, wire 515, normally closed contacts 516 of time delay switch 517 which do not close until the motor has come to rest, as previously explained, wire 518, normally open contacts 550 of switch 101, which are now closed, wire 411, solenoid 65, wire 361, and overload contacts 362 to line L—2. Energization of the solenoid 65 instantaneously pulls the movable element of the clutch O to its neutral position whereupon the contacts 550 of switch 101 open breaking the circuit to the solenoid 65.

The operation of the solenoid 65 is delayed until the motor 21 stops by the solenoid time delay relay 517, the operation of which has been described. When the motors 21 and 23 are jogged by means of the jog push button switch 258 all of the control circuits are deenergized between the interval that the normally closed contacts of the jog push button switch are opened and the time the normally open contacts thereof are closed. However, under these circumstances, the circuit through the solenoid 65 is established through the contacts 310 of relay 306, the operating solenoid 305 of which is energized upon the closing of the normally open contacts of the jog push button switch 258, thus avoiding any possibility of the clutch O remaining engaged and interfering with the subsequent operation of the machine.

*Backrest block clamp*

The normally closed contacts 526 and 529 of clamp motor control panel 527, which are in series with the head selecting switch 244, prevent operation of the spindle head and backrest block while the same are clamped to their respective columns. The backrest block G is clamped and unclamped to the backrest column D simultaneously with the clamping and unclamping of the spindle head C to the spindle head column B. When the clamping lever 231 is rotated in a clockwise direction to clamp the spindle head C to the column B, a double throw clamp motor switch 230 associated therewith is operated to open the normally closed contacts thereof and close the normally open contacts. This established a circuit from the line L—1 through the normally open contacts of clamp motor switch 230, wire 598, operating solenoid 599 of clamp motor control panel 527 to L—2. Energization of the operating solenoid 599 of motor control panel 527 closes the normally open contacts 622, 623, and 624, connecting the clamp motor 25 to the line in such a manner that it rotates in a direction to clamp the backrest block G to the column D. Energization of the operating solenoid 599 of motor control panel 527 also opens the normally closed contacts 529 and 530 thereof. As previously stated, contacts 529 are connected in series with the spindle head and backrest block selecting switch 244 and the opening of these contacts prevents movement of the spindle head or backrest block while the same are clamped to the ways.

When the clamp lever 231 is rotated in a counterclockwise direction to unclamp the spindle head C from the column B and the backrest block G from the column D, the normally open contacts of clamp motor switch 230 are opened and the normally closed contacts thereof closed, deenergizing the operating solenoid 599 of motor control panel 527 and closing contacts 530. This establishes a circuit from the line L—1, through normally closed contacts of clamp motor switch 230, wire 625, normally closed contacts 530, wire 626, operating solenoid 627 of motor control panel 527, wire 628, clamp motor limit switch 232 to L—2. Energization of the operating solenoid 627 of motor control panel 527 closes the main contacts 630, 631 and 632 thereof, connecting the motor 25 to the main line in such a manner that it rotates in a reverse direction, that is, in a direction to unclamp the backrest block G from the column D. Simultaneously contacts 526 in series with head selecting switch 244 are opened. When the backrest block G is unclamped, the circuit to the operating solenoid 627 of motor control panel 527 is broken by the opening of clamp motor limit switch 232. It will be noted that the switch 230 is connected directly to the line L—1. This is an important feature as with this arrangement the circuits to the clamp motor 25 are not disturbed when the jog push button switch 258 is depressed, irrespective of whether the clamp switch is of the double or single pole type. An arrangement using a single pole clamp switch is shown in the aforesaid copending application of H. M. Lucas et al., Serial No. 243,616.

From the foregoing description, it will be apparent that the spindle head and backrest block can be moved in any desired direction provided they are unclamped from their respective columns, the spindle 19 is rotating, and the selecting switches 250, 256, and 262 which control the movement of the saddle, table, and spindle, respectively, are in their "off" positions, by turning the selecting switch 244 to its "on" position and depressing the desired push button on the pendant control station H.

The spindle head and backrest block can be repeatedly stopped at a predetermined point while moving in an upward direction through the medium of the spindle head dial indicator rapid traverse limit switch 107' and the spindle head dial indicator stop limit switch 105'. When the spindle head dial indicator rapid traverse limit switch 107' is opened the rapid traverse friction clutch solenoid 36 is deenergized and when the spindle head dial indicator stop limit switch 105' is opened by continued movement of the spindle head at feed rate, the spindle head, etc., stop instantaneously because of the "plugging" circuits associated with the motor 21. The accuracy with which the spindle head stops is indicated on the dial indicator 127'.

Saddle

To move the saddle, the selecting switch 250 is first turned to its "on" position. Assuming that the spindle feed is not operating, in which event contacts 359 and 365 are closed, and that the selecting switches 244 and 256 are "off," a circuit is then established from the line L—1, through jog push button switch 258, wire 271, normally closed contacts 359 of relay 320, wire 391, normally closed contacts 365 of relay 319, wire 392, selecting switch 250, wire 575, operating solenoid 576 of relay 329, wire 577, saddle clamp limit switch 578, wire 579, normally closed contacts 545 of relay 326, wire 580, and normally closed contacts 405 of relay 394, wire 582, normally closed contacts 551 of switch 101, wire 583, normally closed contacts 487 of switch 102 to L—2. In the event that either of the clutches N or O is engaged for any reason, the contacts 551 and 487 of the switches 101 and 102, respectively, will be open thus preventing the circuit from closing. Simultaneously, the operating solenoid 584 of relay 585 and the indicating light 251 are energized as they are connected in parallel with the operating solenoid 576 of relay 329. Energization of the operating solenoid 576 of relay 329 closes the normally open contacts 586 and opens the normally closed contacts 398, 512, 534 and 587 thereof. Energization of the operating solenoid 584 of relay 585 closes the normally open contacts 589, 590, 591, 592 and 593. The closing of the contacts 593 of relay 585 establishes a circuit from the wire 575, through the contacts 593, wire 594, solenoid 55, wire 361, and solenoid overload contacts 362 to L—2. Energization of the solenoid 55 shifts the movable clutch element 53, engaging the clutch M and connecting the lead screw 54 with the motor 21, and closing the normally open contacts 595 of switch 100 and opening the normally closed contacts 484 and 538.

The saddle can now be moved along the bed by depressing either of the "continuous" push buttons 246 and 247, or either of the "inch" push buttons 248 and 249. To feed the saddle to the right, the right "continuous" push button 246 is depressed, opening the normally closed contacts and closing the normally open contacts thereof. Closing of the normally open contacts establishes a circuit from the line L—1, through jog push button switch 258, wire 271, through the stop all feeds push button switch 261, wire 342, saddle feed and rapid traverse right limit switch 145, wire 601, contacts 591 of relay 585, wire 602, normally open contacts of push button switch 246, wire 427, operating solenoid 428 of relay 429, wire 430, and either normally open contacts 431 or 432 of the motor control panel 280, depending upon the direction of rotation of the main driving motor 23, to line L—2. The closing of contacts 436 of relay 429 closes a circuit from the wire 575, through the contacts 586 of relay 329, wire 603, transformer 604, wire 605, and contacts 436 to L—2, energizing the indicating light located in the push button 246, which indicating light is connected to the secondary of the transformer 604 by the wires 607 and 608.

The closing of contacts 434 of relay 429 establishes a holding circuit for the relay from the line L—2, through jog push button switch 258, wire 271, through the normally closed contacts of stop all feeds push button switch 261, wire 324, saddle feed and rapid traverse right limit switch 145, wire 601, contacts 592 of relay 585, wire 609, normally closed contacts of push button switch 249, wire 610, normally closed contacts of continuous left push button switch 247, wire 447, contacts 434, wire 427, operating solenoid 428 of relay 429, wire 430, and contacts 431 or 432 of motor control panel 280 to line L—2. This holding circuit maintains the operating solenoid of the relay 429 energized after the push button switch 246 has been released. The closing of contacts 435 of relay 429 completes a circuit from the wire 447, through the contacts 435, wire 448, operating solenoid 449 of motor control panel 450, wire 451, overload contacts 452 of motor control panel 450, wire 453, and overload contacts 454 of motor control panel 450 to L—2. Energization of the operating solenoid 449 of the motor control panel 450 connects the feed and rapid traverse motor 21 to the main line in such a manner that the motor rotates in a direction to move the saddle to the right. Simultaneously normally open contacts 458 and 459 of motor control panel 450 are closed and normally closed contacts 460 are opened.

The motor 21 continues to rotate as long as the holding circuit for the relay 429 is maintained and so long as the limit switch 145 remains closed. Upon the opening of either the limit switch 145, jog push button switch 258, or stop all feeds push button switch 261, the circuit to the operating solenoid 449 of the motor control panel 450 is broken and the motor 21 disconnected from the line. Deenergizing the operating solenoid 428 of the relay 429 opens the primary circuit to the transformer 604 and extinguishes the indicating light in the continuous right push button switch 246. The saddle can be inched to the right by depressing the "inch" right push button switch 248. This closes a circuit from the line L—1, through jog push button switch 258, wire 271, stop all feeds push button 261, wire 324, saddle feed and rapid traverse limit switch 145, wire 601, contacts 591 of relay 585, wire 602, normally open contacts of push button switch 248, wire 448, operating solenoid 449 of motor control panel 450, etc. Energization of the operating solenoid 449 of the motor control panel 450 closes the main contacts 455, 456 and 457 thereof, causing the motor 21 to rotate in the same direction as previously referred to. The motor continues to rotate so long as the "inch" right push button switch 248 is depressed.

The saddle can be moved to the left continuously by depressing the "continuous" left push button switch 247. This establishes a circuit from the line L—1, through jog push button switch 258, wire 271, normally closed contacts of stop all feeds push button switch 261, wire 324, saddle feed and rapid traverse left limit switch 146, wire 612, contacts 589 of relay 585, wire 613, normally open contacts of "continuous" left push button switch 247, wire 462, operating solenoid 463 of relay 464, wire 430, and either contacts 431 or 432 of motor control panel 280 to L—2. The closing of contacts 465 of relay 464 establishes a circuit from wire 575, contacts 586 of relay 329, wire 603, transformer 615, wire 616, and contacts 465 to L—2. Energization of transformer 615 energizes the indicating lamp in the "continuous" left push button switch 247, which lamp is connected to the secondary of the transformer 615 by the wires 608 and 619.

The closing of contacts 467 of relay 464 completes a holding circuit therefor from the line L—1, through jog push button switch 258, wire 271, normally closed contacts of stop push button switch 261, wire 324, saddle feed and rapid traverse left limit switch 146, wire 612, normally open contacts 590 of relay 585, wire 620, normally closed contacts of "inch" right push button switch 248, wire 621, normally closed contacts of "continuous" right push button switch 246, wire 477, contacts 467, wire 462, operating solenoid 463 of relay 464, wire 430, and contacts 431 or 432 to line L—2. This holding circuit maintains the relay 464 energized after the "continuous" left push button switch 247 has been released. The closing of contacts 468 of relay 464 completes a circuit from wire 477, through contacts 468, wire 478, operating solenoid 479 of motor control panel 450, wire 451, overload contacts 452 of motor control panel 450, wire 453, and overload contacts 454 of motor control panel 450 to L—2. Energization of the operating solenoid 479 of motor control panel 450 closes the contacts 480, 481, and 482 thereof connecting the motor 21 to the line in such a manner that it rotates in a direction to move the saddle to the left. The motor continues to operate until the limit switch 146 is opened by the saddle reaching the end of its travel or until the feed stop push button switch 261 is depressed. When the motor is stopped, the holding circuit for relay 464 is broken and the indicating lamp in the continuous left push button switch 247 is extinguished.

The saddle can be inched to the left by depressing the "inch" left push button switch 249 closing the normally open contacts thereof. This establishes a circuit from the line L—1, through jog push button switch 258, wire 271, normally closed contacts of push button switch 261, wire 324, saddle feed and rapid traverse left limit switch 146, wire 612, normally open contacts 588 of relay 585, wire 613, normally open contacts of "inch" left push button switch 249, wire 478, operating solenoid 479 of motor control panel 450, etc., to L—2. Energization of the operating solenoid 479 of the motor control panel 450 causes the main contacts 480, 481 and 482 thereof to close, connecting the motor to the line. The motor continues to operate as long as the "inch" push button switch 249 is depressed sufficiently to hold the normally open contacts thereof closed.

The spindle 19 must be rotating otherwise the table, spindle head and backrest block, or the saddle cannot be moved since the contacts 431 and 432 are only closed when the main motor 23 is rotating in one direction or the other. With the motors 23 and 21 rotating, the saddle can be rapid traversed in either direction, depending upon the direction of rotation of the motor 21 by merely depressing the normally open rapid traverse push button switch 261 to close the contacts thereof. The circuits established are similar to those described with reference to the table, spindle head and backrest block controls, except that in the present instance the dial indicator rapid traverse switches 107 and 107' are both shunted out. When the rapid traverse push button switch 260 is released, the solenoid 36 is deenergized, the friction clutch L disengaged, and the rapid traverse movement stopped.

When the selecting switch 250 is turned to its "off" position, the operating circuits to relays 329 and 585 and the circuit to the indicating light 251 are broken. This, in turn, opens the circuit to the solenoid 55, allowing the movable element of clutch M to return to its neutral or disengaged position under the action of the spring 58, disconnecting the lead screw 54 from the motor 21. In the event that the movable clutch element of the clutch M does not immediately return to its neutral position upon deenergization of the operating solenoid 55, a circuit is established through the solenoid 92 upon the opening of relay 329 which causes the contacts 512 thereof to close. The solenoid 92 thereupon pulls the movable clutch element of clutch M into disengaged position. As the clutch M disengages the circuit through solenoid 92 is opened as the normally open contacts 595 of switch 100 are in series therewith. The circuit referred to is from the line L—1, through push button switch 258, wire 271, push button switch 261, wire 324, normally closed contacts 509 of relay 326, wire 511, normally closed contacts 512 of relay 329, wire 514, contacts 407 of relay 332, wire 515, normally closed contacts 516 of time delay relay 517 which do not close until the motor has come to rest, as previously referred to, wire 518, normally open contacts 595 of switch 100, which are now closed, wire 519, solenoid 92, wire 361, and overload contacts 362 to line L—2. Energization of the solenoid 92 instantaneously pulls the movable element of the clutch M to its neutral position, whereupon the contacts 595 of switch 100 open breaking the circuit to the solenoid 92.

The operation of the solenoid 92 is delayed until the motor 21 stops by the solenoid time delay relay 517, the operation of which has been described. When the motors 21 and 23 are jogged by means of the jog push button switch 258 all of the control circuits are deenergized. However, under these circumstances, the circuit through the solenoid 92 is established by contacts 310 of relay 306, the operating solenoid 305 of which is energized upon the closing of the normally open contacts of the jog push button switch 258, thus avoiding any possibility of the clutch M remaining engaged and interfering with the subsequent operation of the machine.

From the foregoing description of the saddle control it will be apparent that the saddle can be moved in any desired direction provided the spindle 19 is rotating and the selecting switches 244, 256, and 262 which control the movement of the table, spindle head and backrest block, and spindle, respectively, are in their "off" positions, by turning the selecting switch 250 to its "on" position and depressing the desired push button on the pendant control station H.

*Backrest column control*

According to the provisions of the present invention, the backrest column D can be moved along the horizontal ways of the bed by a reversible electric motor 26 secured to the rear side of the backrest column and operatively connected to the saddle lead screw 54 in a manner known in the art. The motor 26 is controlled by two push button switches 237 and 238 located underneath the backrest column clamp lever 239. The construction is such that the switches cannot be operated unless the backrest column clamp lever is in a position to unclamp the column from the ways. Depressing the backrest column left push button switch 237 establishes a circuit from the line L—1, through normally closed contacts of jog push button switch 258, wire 271, stop all feeds push button switch 261, wire 324, saddle right limit switch 145, wire 601, switch 237, wire 638, operating solenoid 639 of motor control panel 640, wire 641, normally closed overload contacts 642, wire 643, and normally closed overload contacts 644 of motor control panel 640 to line L—2. Energization of the operating solenoid 639 of motor control panel 640 closes the main contacts 645, 646 and 647, connecting the motor 26 to the main line in such a manner that the motor is rotated in a direction to move the backrest column G towards the left. When the backrest column left push button switch 237 is released, the circuit to the solenoid 639 is broken and the motor stopped. The fact that the backrest column left push button switch 237 is in series circuit with the saddle right limit switch 145 prevents one member from being moved against the other. The backrest column D is moved in a reverse direction by depressing the normally open backrest column right push button switch 238. This establishes a circuit from the line L—1, through normally closed contacts of jog push button switch 258, wire 271, push button switch 238, wire 648, operating solenoid 649 of motor control panel 640, wire 641, overload contacts 642, wire 643, and overload contacts 644 to L—2. Energization of the operating solenoid 649 of motor control panel 640 closes the main contacts 650, 651 and 652 thereof connecting the motor 26 to the line in such a manner that it rotates in a reverse direction. When the push button switch 238 is released, the circuit to the operating solenoid 649 of motor control panel 640 is broken, and the motor stops.

From the foregoing description of the preferred embodiments of the invention, it will be apparent that the objects of the invention heretofore enumerated and others have been attained and that a new and improved machine of the character described has been provided. All movements of the spindle head, table, and saddle are controlled from the electrical control pendant which can be readily positioned within the operator's reach. This control station is so arranged that when the operator has become familiar with the relative location of the various push buttons and selector switches, he can control any movement or adjustment by touch without taking his eyes off of the work or cutting tool. Indicating lights show the unit selected for operation and interlocks cut out all other units. Automatic limit switches stop all motions of the various units in both directions, thus preventing over-travel. Merely engaging the electrical control for motion in the opposite direction backs any unit off of its limit switch.

The table is provided with an automatic cycle of alternate feed and rapid traverse movements which may be readily set up by adjustable trips for milling interrupted surfaces, etc., and with automatic indexing mechanism operated by end measuring rods and incorporating a dial indicator to determine at a glance the accuracy with which the table is indexed. Similar automatic indexing mechanism is incorporated in the spindle head and backrest block control. The backrest block is clamped to the backrest block column electrically by remote control through a switch operated simultaneously with the lever which clamps the spindle head to both ways of the spindle head column. Interlocks prevent vertical movement of the spindle head and backrest block while clamped.

The clutches M, N, and O are so interlocked that it is impossible to have more than one engaged at any one time, and impossible to have any clutch engaged other than the one associated with the selecting switch and indicating light which are "on." Two or more selecting switches may be turned to their "on" positions and in this event the indicating lights tell at a glance which is effective.

While the preferred embodiment of the invention has been described with considerable detail, I do not wish to be limited to the particular construction which may be varied within the scope of this invention and it is my intention to hereby cover all adaptations, modifications and variations which come within the practice of those skilled in the art to which the invention relates.

Having thus described my invention, what I claim is:

1. In a horizontal boring and milling machine of the character described, the combination of: a bed having a column adjacent to one end thereof; a saddle movably supported on said bed; a table member movably supported on said saddle; a spindle head member movably supported on said column; power means for causing said members to move at a relatively fast speed; power means including a reversible electric motor for causing said members to move at a relatively slow speed; a source of power for said reversible electric motor; means for initiating the actuation of the first-mentioned power means to move one of said members at the relatively fast speed; means for stopping said member in a predetermined position to within a fraction of a thousandth of an inch comprising an electric circuit including means actuated by the movement thereof for rendering the first-mentioned power means inoperative to continue the movement of the member and the second-mentioned power means operative to move the member at a relatively slow speed, and means actuated by continued movement of said member at the relatively slow speed for disconnecting said reversible electric motor from its source of power and connecting it to the source of power until it comes to rest in such a manner that it tends to rotate in the reverse direction; and means for visually indicating the accuracy with which the member stops with respect to the selected position.

2. In a horizontal boring and milling machine of the character described, the combination of a bed having a spindle head column adjacent one end thereof and a backrest block column adjacent to the opposite end thereof, a saddle member movably supported on said bed, a table member movably supported on said saddle member, a spindle head member movably supported on said spindle head column, a backrest block member movably supported on said backrest block column, means for clamping and unclamping said spindle head member to and from said spindle head column, means including a reversible electric motor for clamping and unclamping said backrest block member to and from said backrest column, a common power means including a second electric motor for moving said members, electric solenoid operated clutches for operatively connecting and disconnecting said members with said common power means, a control circuit for engaging and disengaging said clutches selectively including a manually operated selecting means, a control circuit for actuating said first electric motor to clamp said backrest block member to said backrest column including a switch operatively associated with said means for clamping and unclamping said spindle head member to and from said spindle head column and a solenoid operated contactor for connecting said motor with a source of energy, a control circuit for said second electric motor including normally open contacts closed upon actuation of said selecting means to select one of said clutches, normally closed contacts in said last-mentioned control circuit when said selector means is positioned to connect said power means with said spindle head member, and means actuated by said solenoid operated contactor for opening and closing said last-mentioned contacts.

3. In a horizontal boring and milling machine of the character described, the combination of a bed having a spindle head column adjacent one end thereof and a backrest block column adjacent to the opposite end thereof, a saddle member movably supported on said bed, a table member movably supported on said saddle member, a spindle head member movably supported on said spindle head column, a backrest block member movably supported on said backrest block column, means for clamping and unclamping said spindle head member to and from said spindle head column, means including a reversible electric motor for clamping and unclamping said backrest block member to and from said backrest column, a common power means including a second electric motor for moving said members, electric solenoid operated clutches for operatively connecting and disconnecting said members with said common power means, a control circuit for engaging said clutches including a manually operated selecting switch, a control circuit for disengaging said clutches, a control circuit for said first electric motor including a switch operatively associated with said means for clamping and unclamping said spindle head member to and from said spindle head column and a solenoid operated contactor for connecting said motor with a source of energy, a control circuit for said second electric motor including normally open contacts closed upon actuation of said selecting means to select one of said clutches, normally closed contacts in said last-mentioned control circuit when said selector means is positioned to connect said power means with said spindle head member, and means actuated by said solenoid operated contactor for opening and closing said last-mentioned contacts.

4. In a device of the character described, the combination of a movable member, power-actuated means including an electric motor for moving said member, a control circuit for energizing said electric motor, a clutch for operatively connecting and disconnecting said member to and from said power-actuated means, an electric solenoid for actuating said clutch to connect said member to said power-actuated means, a control circuit for energizing and de-energizing said electric solenoid comprising a manually-operated multi-position selecting switch having normally open contacts in the first-mentioned control circuit whereby said motor and said solenoid are simultaneously de-energized by actuation of said selecting switch to a position other than the position necessary to energization of said motor and solenoid, an electric solenoid for actuating said clutch to disconnect said member from said power-actuated means, a control circuit for energizing said last-mentioned electric solenoid, said last-mentioned control circuit having contacts adapted to close upon actuation of said second-mentioned control circuit to de-energize said first-mentioned solenoid, and means for preventing the establishment of said third-mentioned control circuit while said motor is rotating.

5. In a horizontal boring and milling machine of the character described, the combination of a bed having a vertical column adjacent to one end, a saddle member movably supported on said bed, a table member movably supported on said saddle, a spindle head member movably supported on said column, common power-actuated means including an electric motor for moving said members, a control circuit for energizing said motor, clutches for operatively connecting and disconnecting said power-actuated means to said members, electric solenoids for actuating said clutches to connect said power-actuated means to said members, a control circuit for selectively energizing and de-energizing said solenoids comprising a manually-operated multi-position selecting means having normally open contacts in the first-mentioned control circuit whereby said motor and a selected one of said solenoids are simultaneously de-energized by actuation of said selecting means to a position other than the position necessary to energization of said motor and said selected solenoid, electric solenoids for actuating said clutches to disconnect said members from said power-actuated means, a control circuit for selectively energizing said last-mentioned electric solenoids, said last-mentioned control circuit having contacts adapted to close upon actuation of said second-mentioned control circuit to de-energize a selected one of the first-mentioned solenoids, and means for preventing the establishment of said last-mentioned control circuit while said motor is operating.

HALLIS N. STEPHAN.